US012579071B1

(12) United States Patent
Meier et al.

(10) Patent No.: US 12,579,071 B1
(45) Date of Patent: Mar. 17, 2026

(54) PATTERN MATCH PREFETCHER WITH SUPPLEMENTAL PROGRAM-COUNTER-BASED LEARNING

(71) Applicant: Apple Inc., Cupertino, CA (US)

(72) Inventors: Stephen G. Meier, Los Altos, CA (US); Tyler J. Huberty, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/925,984

(22) Filed: Oct. 24, 2024

Related U.S. Application Data

(60) Provisional application No. 63/692,904, filed on Sep. 10, 2024.

(51) Int. Cl.
*G06F 12/08* (2016.01)
*G06F 12/02* (2006.01)
(Continued)

(52) U.S. Cl.
CPC ...... *G06F 12/0862* (2013.01); *G06F 12/0292* (2013.01); *G06F 12/0891* (2013.01)

(58) Field of Classification Search
CPC .. G06F 12/0862; G06F 12/0292; G06F 12/08; G06F 12/0891; G06F 12/12; G06F 12/0215; G06F 13/42; G06F 12/02
See application file for complete search history.

(56) References Cited

U.S. PATENT DOCUMENTS 9,015,422 B2 4/2015 Meier et al.
9,582,282 B2 2/2017 Hayenga et al.
(Continued)

FOREIGN PATENT DOCUMENTS

CN 106024052 A 10/2016
CN 105930281 B 1/2019
(Continued)

OTHER PUBLICATIONS

G. O. Ganfure, C.-F. Wu, Y.-H. Chang and W.-K. Shih, "Deep-Prefetcher: A Deep Learning Framework for Data Prefetching in Flash Storage Devices," in IEEE Transactions on Computer-Aided Design of Integrated Circuits and Systems, vol. 39, No. 11, pp. 3311-3322, Nov. 2020.*
(Continued)

*Primary Examiner* — Pierre Michel Bataille
(74) *Attorney, Agent, or Firm* — Kowert, Hood, Munyon, Rankin & Goetzel, P.C.; Michael B. Davis; Dean M. Munyon

(57) ABSTRACT

Disclosed techniques relate to supplemental PC-based learning for a pattern-based prefetcher. In some embodiments, prefetch circuitry is configured to store access map data based on address information corresponding to memory accesses and generate, based on the access map data and stored access patterns, one or more prefetch requests to prefetch data to a cache. In some embodiments, supplemental access tracking circuitry is configured to store initial access tracking information for offsets corresponding to a first access map evicted from the prefetch circuitry, store program counter information associated with an initial memory access that touched the first access map, update the access tracking information, based on one or more additional access maps evicted from the prefetch circuitry that match the stored program counter information, and generate, in response to a hit and based on the updated access tracking information, a starting access map for allocation in the prefetch circuitry.

20 Claims, 21 Drawing Sheets

Read out contents of evicted map and check eligibility
*410*

Hit in access tracking circuitry? *420* — Yes

No

New pattern: initialize counter values, adjust based on evicted map, reset granularity, set granularity confidence counter, mark valid, write new tag, arm if confidence counters meet threshold
*430*

Update: update counters based on evicted map if granularities match, otherwise update granularity confidence counter (change to evicted map granularity if threshold met), arm if confidence counters meet threshold
*440*

(51) Int. Cl.
  *G06F 12/0862* (2016.01)
  *G06F 12/0891* (2016.01)

(56) References Cited

U.S. PATENT DOCUMENTS

| | | | |
|---|---|---|---|
| 9,785,571 B2 | 10/2017 | Shiu | |
| 10,089,240 B2 | 10/2018 | Sohi et al. | |
| 10,331,567 B1 | 6/2019 | Meier et al. | |
| 10,539,996 B2 | 1/2020 | HomChaudhuri et al. | |
| 10,540,287 B2 | 1/2020 | Meier et al. | |
| 10,572,378 B2 | 2/2020 | Li et al. | |
| 10,621,100 B1 * | 4/2020 | Meier | G06F 12/0862 |
| 11,126,556 B1 * | 9/2021 | Mukherjee | G06F 12/0862 |
| 11,379,372 B1 * | 7/2022 | Mukherjee | G06F 9/30047 |
| 11,507,519 B2 | 11/2022 | Kotra et al. | |
| 11,520,585 B2 | 12/2022 | Lloyd et al. | |
| 11,573,900 B2 | 2/2023 | Guim et al. | |
| 11,645,148 B2 | 5/2023 | Zeng et al. | |
| 11,726,917 B2 | 8/2023 | Mashimo et al. | |
| 11,797,307 B2 * | 10/2023 | Nathella | G06F 9/30047 |
| 11,809,318 B2 | 11/2023 | Zhang et al. | |
| 11,966,382 B2 | 4/2024 | Boivie et al. | |
| 11,972,126 B2 | 4/2024 | Durham et al. | |
| 2015/0026413 A1 * | 1/2015 | Meier | G06F 12/0862 |
| | | | 711/137 |
| 2016/0054997 A1 | 2/2016 | Radhakrishnan et al. | |
| 2021/0365267 A1 | 11/2021 | Lee et al. | |
| 2022/0019537 A1 * | 1/2022 | Roberts | G06F 12/0891 |
| 2022/0206958 A1 | 6/2022 | LeMay et al. | |
| 2023/0004318 A1 | 1/2023 | Zhang et al. | |
| 2023/0110541 A1 * | 4/2023 | Pusdesris | G06F 12/0897 |
| | | | 711/154 |
| 2023/0205699 A1 | 6/2023 | Sha et al. | |
| 2023/0222065 A1 * | 7/2023 | Reed | G06F 12/0862 |
| | | | 711/118 |
| 2024/0111677 A1 * | 4/2024 | Loh | G06F 12/0284 |

FOREIGN PATENT DOCUMENTS

| | | | | |
|---|---|---|---|---|
| CN | 113190499 A | 7/2021 | | |
| CN | 113986774 A | 1/2022 | | |
| CN | 111143242 B | 5/2022 | | |
| CN | 111506517 B | 5/2022 | | |
| CN | 115309453 A | 11/2022 | | |
| CN | 116502239 A | 2/2024 | | |
| CN | 117389630 B | 3/2024 | | |
| CN | 117972799 A | 5/2024 | | |
| KR | 102031490 B1 | 10/2019 | | |
| KR | 2024025417 A | 2/2024 | | |
| WO | WO-2024072574 A1 * | 4/2024 | ........ | G06F 12/0862 |

OTHER PUBLICATIONS

C. Yang, L. Liu, S. Yin and S. Wei, "Data cache prefetching via context directed pattern matching for coarse-grained reconfigurable arrays," 2016 53nd ACM/EDAC/IEEE Design Automation Conference (DAC), Austin, TX, USA, 2016, pp. 1-6.*

Partap et al., "Memory Tagging: A Memory Efficient Design," Google Scholar, Nov. 3, 2022, 16 pages.

Unterguggenberger et al. "Multi-Tag: A Hardware-Software Co-Design for Memory Safety based on Multi-Granular Memory Tagging," Proceedings of the 2023 ACM Asia Conference on Computer and Communications Security, Jul. 10, 2023, pp. 177-189.

Chen et al., "FlexPointer: Fast Address Translation Based on Range TLB and Tagged Pointers," ACM Transactions on Architecture and Code Optimization, Mar. 1, 2023, pp. 1-24.

Xia et al., "CHERIvoke: Characterising Pointer Revocation using CHERI Capabilities for Temporal Memory Safety," Proceedings of the 52nd Annual IEEE/ACM International Symposium on Microarchitecture, Oct. 12, 2019, pp. 545-557.

Koruyeh, "Architectural Support for Securing Systems Against Micro-Architectural Attacks," PhD dissertation at University of California Riverside, Sep. 2023, 192 pages.

* cited by examiner

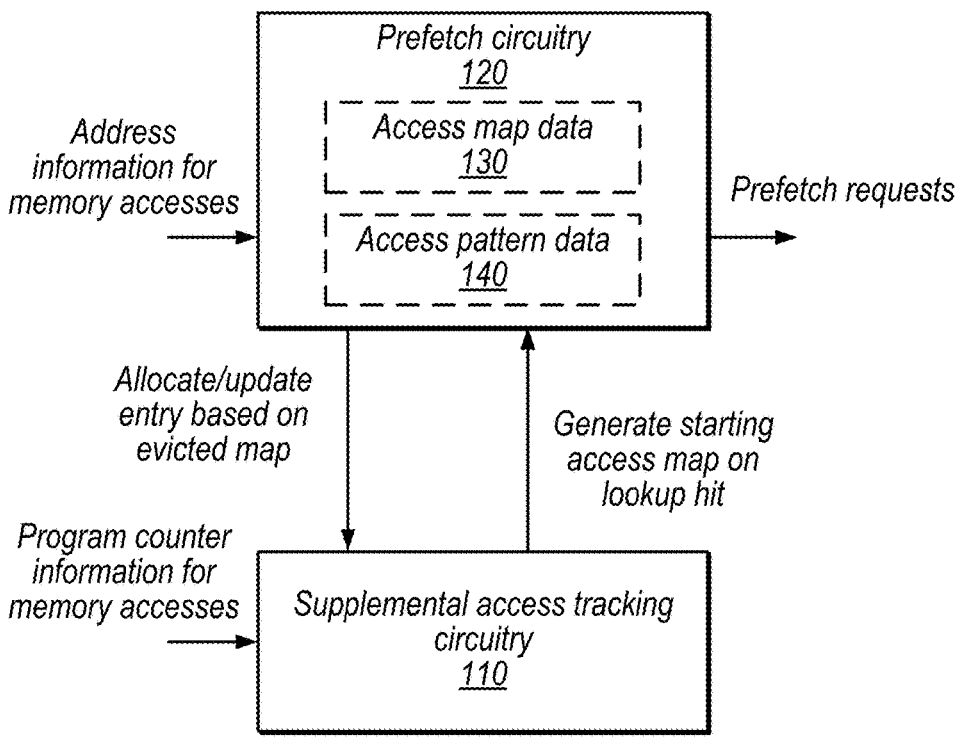

Prefetch circuitry
120

Access map data
130

Access pattern data
140

Address information for memory accesses

Prefetch requests

Allocate/update entry based on evicted map

Generate starting access map on lookup hit

Program counter information for memory accesses

Supplemental access tracking circuitry
110

*FIG. 1*

Example entry in supplemental access tracking circuitry

| Tag 210 | Per-map-offset confidence counters 220 | Valid 230 | Gran 240 | Gran confidence 250 | Armed 260 |
|---------|----------------------------------------|-----------|----------|---------------------|-----------|

*FIG. 2*

Example evicted map 310

. . . . @ A P 3 S S 3 3 3 . . .

Example counter increment vector (for evicted map) 320

3  -1  -1  3  3  -1  -1  -1  -1  -1  -1

Example access tracking entry counter values 330 (after updates based on multiple evictions)

7  2  1  3  3  2  1  0  0  0  0

Example prefetcher starting map 340 (based on "!" threshold = 4 and "#" threshold = 3)

@  !  .  .  #  #  .  .  .  .  .  .

Legend - example access category symbols

| | |
|---|---|
| . | no access |
| A | earlier demand access |
| ! | prefetch pending to level N cache |
| # | prefetch pending to level N+M cache |
| P | prefetch launched to level N cache |
| 3 | prefetch launched to level N+M cache |
| S | hit on a prefetch |
| % | most recent demand access to map |
| @ | initial demand access to map |
| * | wildcard (in a stored pattern; not used in an access map) |

FIG. 3

*Example prefetch entry data*

| Access map data 710 | Quality factor data 720 | Gran 730 | Gran up-switch metadata 740 | Gran LRU control counters 750 |
|---|---|---|---|---|

*Example corresponding compressed entry data*

| Compressed access map data 712 | Quality factor data 722 | Gran 732 | Gran LRU control counters (compressed) 752 |
|---|---|---|---|

*Example symbols in map*

.
!

A
S
P
3

*Example corresponding symbols in compressed representation*

.
.
.
A
A
P
3

| Metadata 1210 | Data block 1220 |
*FIG. 12A*
Metadata 1210
Address space
Data block 1220
*FIG. 12B*
Example access map with metadata prefetch indicators
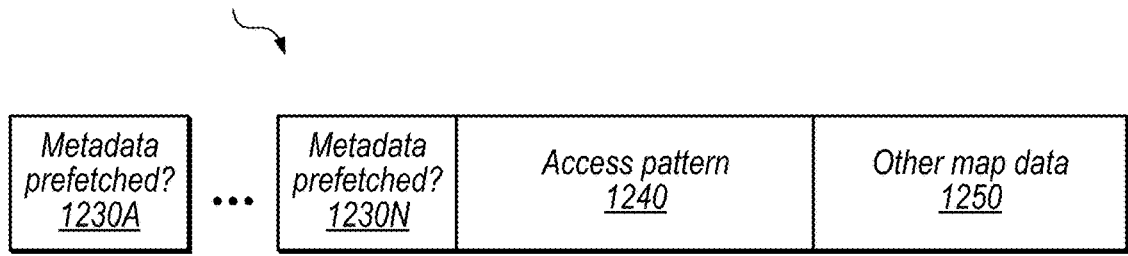
| Metadata prefetched? 1230A | ... | Metadata prefetched? 1230N | Access pattern 1240 | Other map data 1250 |
*FIG. 12C*
Access patterns with metadata prefetch indications →
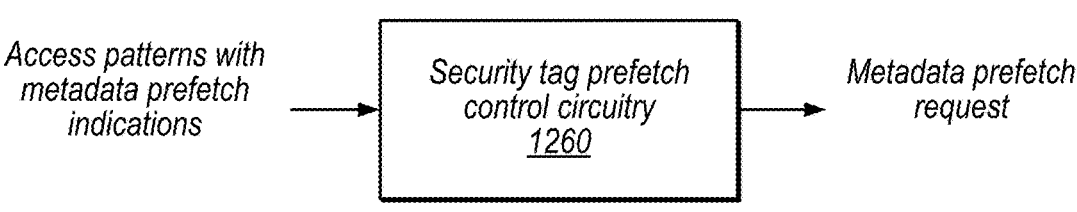
Security tag prefetch control circuitry 1260
→ Metadata prefetch request
*FIG. 12D*

Example map progression and metadata prefetch
(% refers to most recent demand access)

Block boundary

Example state that triggers prefetch of
security tag metadata for the next block, in
this example One cache line of metadata for N data blocks (and the
relationship between access map symbols and data blocks
may vary based on access map granularity)

*Example access category symbols with prefetching into three cache levels (representable using three bits):*

|  |  |
|---|---|
| . | *no access* |
| A | *earlier demand access* |
| P | prefetch launched to level N cache or to level N+Q cache |
| 3 | *prefetch launched to level N+M cache* |
| ! | *prefetch pending to level N cache* |
| # | *prefetch pending to level N+M cache* |
| S | *hit on a prefetch* |
| ^ | prefetch pending to level N+Q cache |

FIG. 14

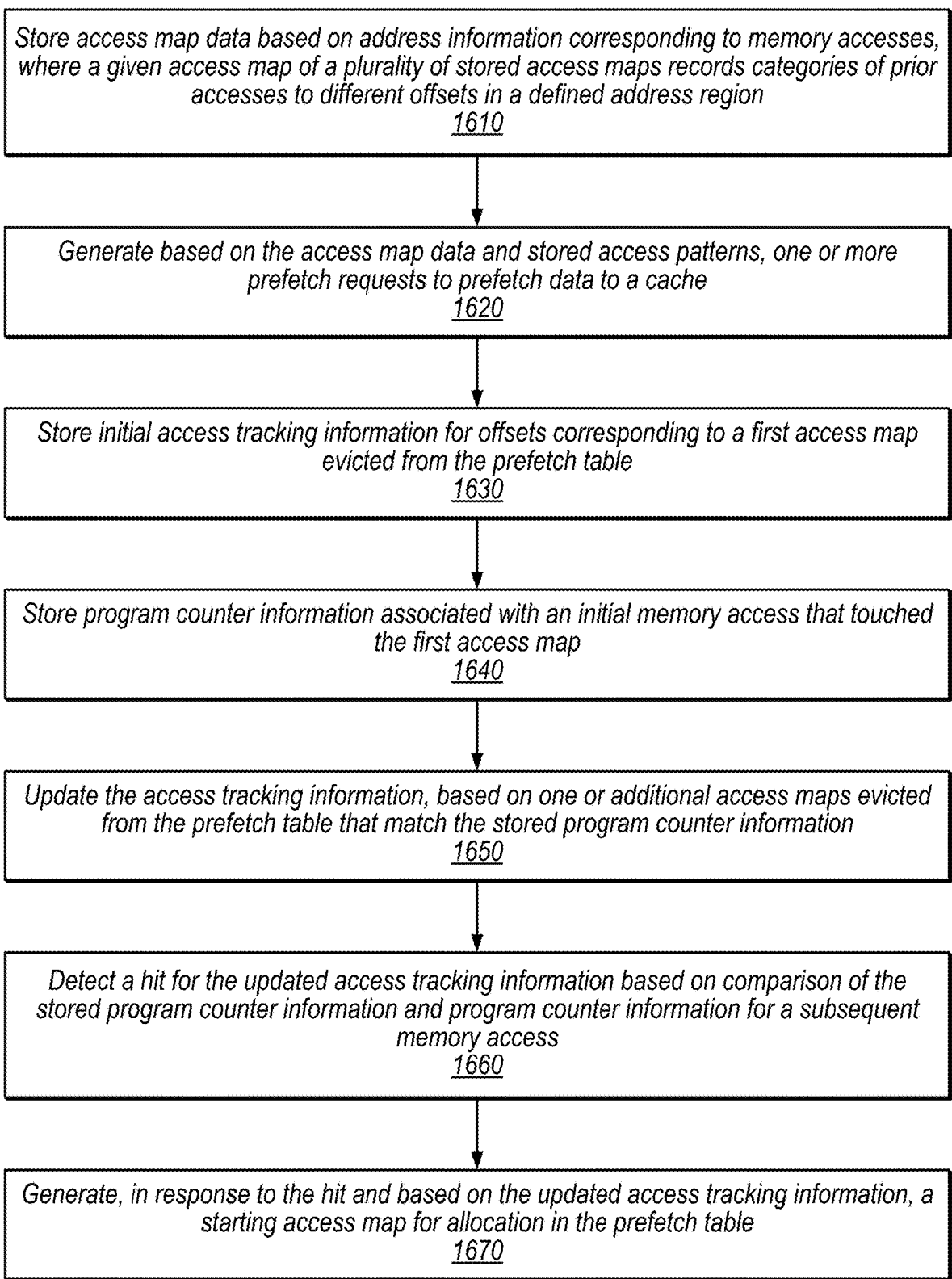

Store access map data based on address information corresponding to memory accesses, where a given access map of a plurality of stored access maps records categories of prior accesses to different offsets in a defined address region
1610

Generate based on the access map data and stored access patterns, one or more prefetch requests to prefetch data to a cache
1620

Store initial access tracking information for offsets corresponding to a first access map evicted from the prefetch table
1630

Store program counter information associated with an initial memory access that touched the first access map
1640

Update the access tracking information, based on one or additional access maps evicted from the prefetch table that match the stored program counter information
1650

Detect a hit for the updated access tracking information based on comparison of the stored program counter information and program counter information for a subsequent memory access
1660

Generate, in response to the hit and based on the updated access tracking information, a starting access map for allocation in the prefetch table
1670

FIG. 16

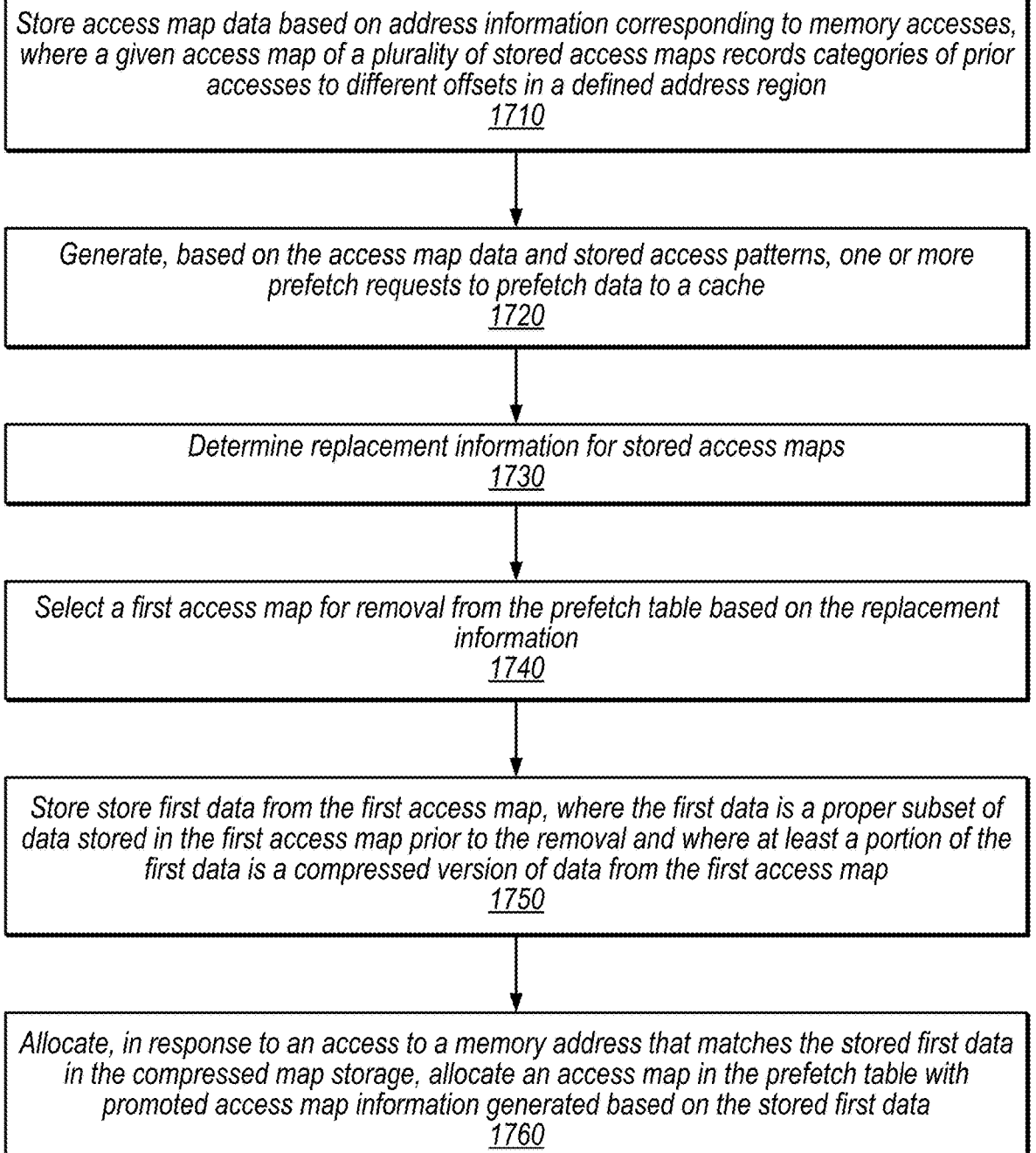

Store access map data based on address information corresponding to memory accesses, where a given access map of a plurality of stored access maps records categories of prior accesses to different offsets in a defined address region
*1710*

Generate, based on the access map data and stored access patterns, one or more prefetch requests to prefetch data to a cache
*1720*

Determine replacement information for stored access maps
*1730*

Select a first access map for removal from the prefetch table based on the replacement information
*1740*

Store store first data from the first access map, where the first data is a proper subset of data stored in the first access map prior to the removal and where at least a portion of the first data is a compressed version of data from the first access map
*1750*

Allocate, in response to an access to a memory address that matches the stored first data in the compressed map storage, allocate an access map in the prefetch table with promoted access map information generated based on the stored first data
*1760*

*FIG. 17*

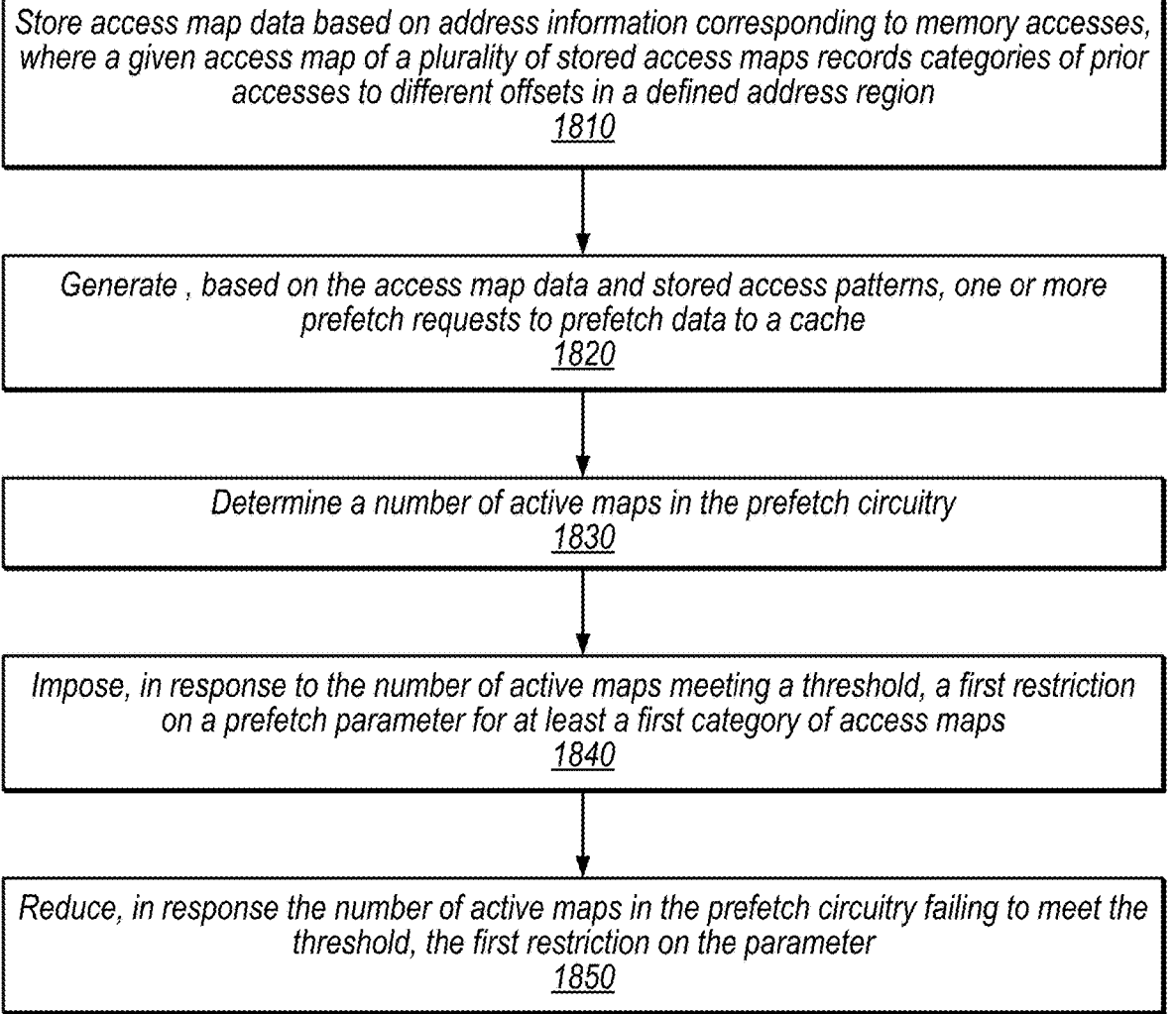

Store access map data based on address information corresponding to memory accesses, where a given access map of a plurality of stored access maps records categories of prior accesses to different offsets in a defined address region
*1810*

Generate , based on the access map data and stored access patterns, one or more prefetch requests to prefetch data to a cache
*1820*

Determine a number of active maps in the prefetch circuitry
*1830*

Impose, in response to the number of active maps meeting a threshold, a first restriction on a prefetch parameter for at least a first category of access maps
*1840*

Reduce, in response the number of active maps in the prefetch circuitry failing to meet the threshold, the first restriction on the parameter
*1850*

*FIG. 18*

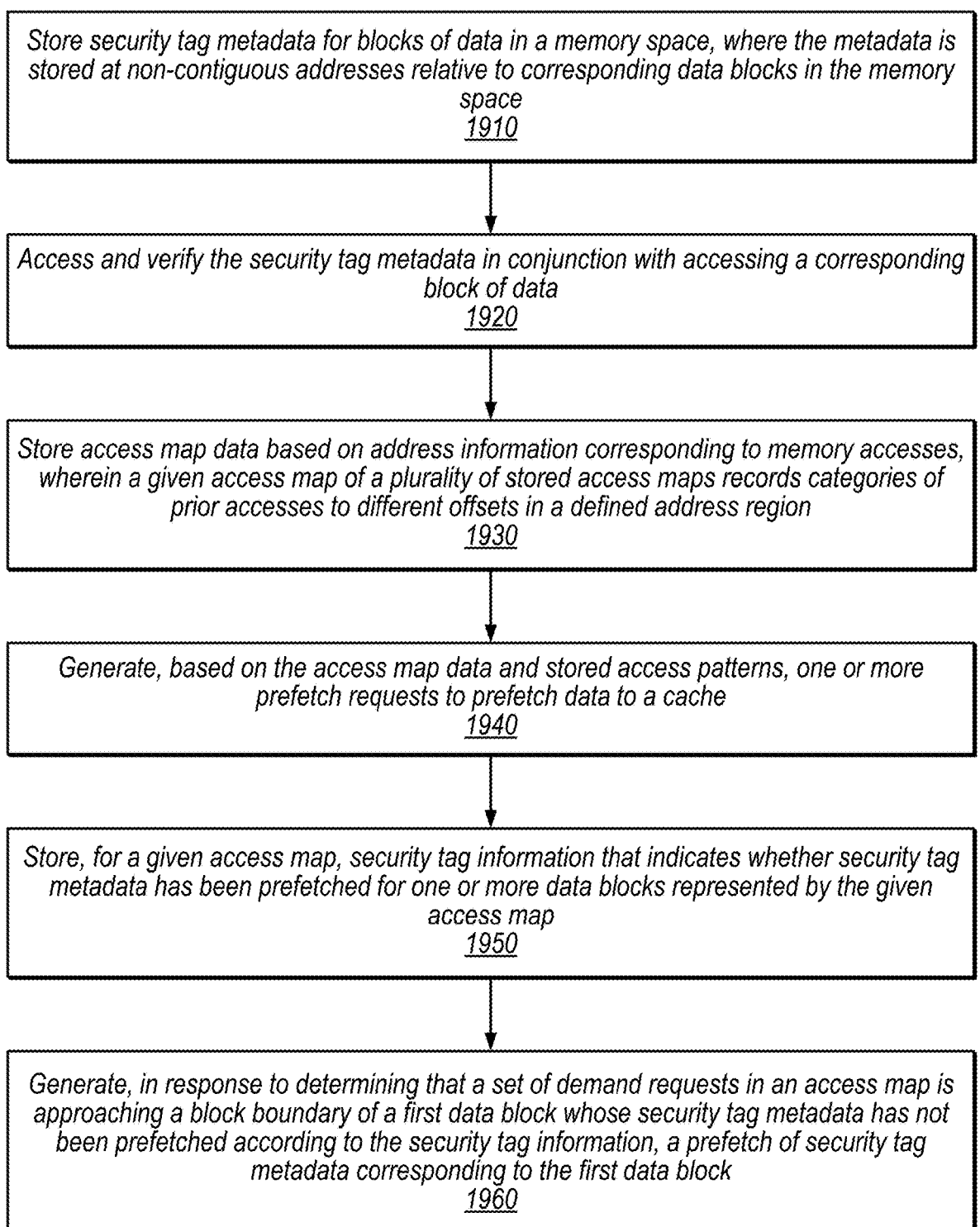

Store security tag metadata for blocks of data in a memory space, where the metadata is stored at non-contiguous addresses relative to corresponding data blocks in the memory space
1910

Access and verify the security tag metadata in conjunction with accessing a corresponding block of data
1920

Store access map data based on address information corresponding to memory accesses, wherein a given access map of a plurality of stored access maps records categories of prior accesses to different offsets in a defined address region
1930

Generate, based on the access map data and stored access patterns, one or more prefetch requests to prefetch data to a cache
1940

Store, for a given access map, security tag information that indicates whether security tag metadata has been prefetched for one or more data blocks represented by the given access map
1950

Generate, in response to determining that a set of demand requests in an access map is approaching a block boundary of a first data block whose security tag metadata has not been prefetched according to the security tag information, a prefetch of security tag metadata corresponding to the first data block
1960

FIG. 19

PATTERN MATCH PREFETCHER WITH SUPPLEMENTAL PROGRAM-COUNTER-BASED LEARNING

CROSS REFERENCE TO RELATED APPLICATIONS

The present application claims priority to U.S. Provisional App. No. 63/692,904, entitled "Pattern Match Prefetcher with Supplemental Program-Counter-Based Learning," filed Sep. 10, 2024, the disclosure of which is incorporated by reference herein in its entirety.

This application is related to the following U.S. Applications filed on Oct. 24, 2024:

U.S. application Ser. No. 18/926,266,
U.S. application Ser. No. 18/926,268,
and U.S. application Ser. No. 18/926,270.

Each of the above-referenced applications is hereby incorporated by reference as if entirely set forth herein.

BACKGROUND

Technical Field

This disclosure relates generally to computer processors and more particularly to prefetching.

Description of Related Art

To improve performance, processors typically implement one or more levels of caching. Data stored in a cache may be available at a much lower latency than data from memory. Thus, cache hits may be provided with low latency and may improve performance of the processors. Cache misses may result in fetches from memory and incur the higher memory latencies.

To reduce effective memory latency, processors may implement prefetching. Generally, prefetching involves predicting which cache blocks the processor will access soon, and initiating the memory read for the cache blocks prior to such accesses being generated via instruction code execution in the processor. If the prefetching successfully reads cache blocks that are later accessed by the processor, memory latency is reduced because the accesses are cache hits instead of cache misses. On the other hand, inaccurate prefetching can cause useful data to be evicted from the cache while the inaccurately prefetched data is not used, which reduces performance. Additionally, even if performance is not adversely affected or improved by a small amount, excess power consumed by the processor to perform the prefetching and additional circuit area utilized by prefetch control might not be justified. Generally, balancing the amount of prefetching to be performed and the effectiveness of the prefetching is a challenge.

BRIEF DESCRIPTION OF DRAWINGS

FIG. 1 is a block diagram illustrating an example system that includes program-counter-based supplemental access tracking circuitry, according to some embodiments.

FIG. 2 is a diagram illustrating an example entry in the supplemental access tracking circuitry, according to some embodiments.

FIG. 3 shows example symbols and counter values that may be used to track evictions and provide a starting access map, according to some embodiments.

FIG. 12A is a diagram illustrating a logical view of an example data block and its corresponding metadata, according to some embodiments.

FIG. 12B is a diagram showing how a data block and its metadata may be stored at different locations in address space, according to some embodiments.

FIG. 12C illustrates an example access map with metadata prefetch indicators for data blocks in the address range associated with an access pattern, according to some embodiments.

FIG. 12D is a block diagram illustrating example security tag prefetch control circuitry, according to some embodiments.

FIG. 14 is a diagram illustrating example access category symbols with prefetching into at least three cache levels, according to some embodiments.

FIGS. 16-19 are flow diagrams illustrating example methods, according to some embodiments.

DETAILED DESCRIPTION

Figure 4:
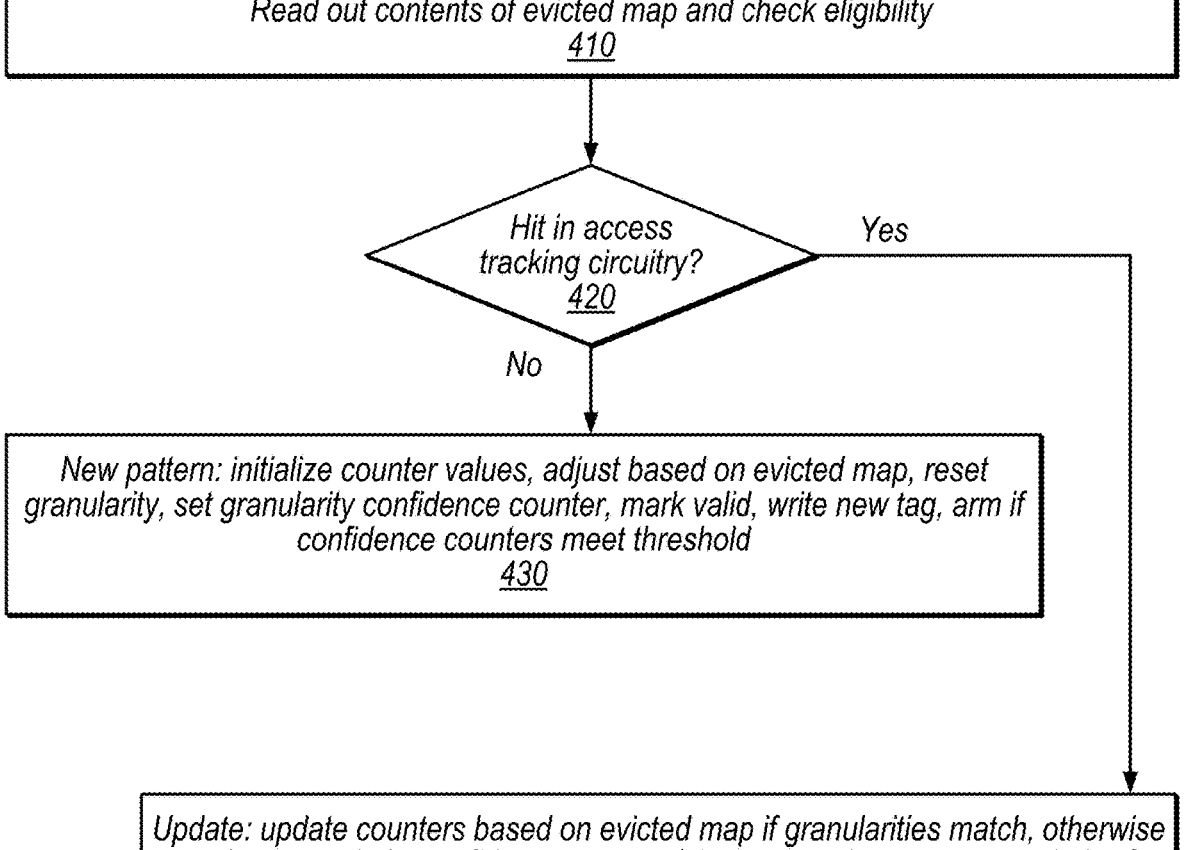
FIG. 4 is a flow diagram illustrating an example method for training supplemental access tracking circuitry, according to some embodiments.

Certain prefetchers may track access maps based on previous memory accesses and may compare those maps to pre-determined stored prefetch patterns. Matches may cause the prefetcher to update the access map to generate prefetch requests (note that prefetch requests may or may not be de-coupled from prefetch launches).

Various techniques discussed herein may provide advantages relative to prior pattern matching prefetch implementations. For example, this disclosure discusses Bayesian PC-based prefetch techniques to supplement an access-map-based prefetcher, compressed storage for demoted prefetch entries, adaptive adjustment of prefetch constraints for certain workloads, fuzzy pattern matching techniques, prefetching for security tag metadata, and prefetch techniques in the context of prefetching for multiple cache levels. The following introduction sections provide a brief introduction to each of these concepts while the remainder of this document covers various example embodiments in greater detail.

Note that a generalized discussion of prefetch circuitry for one or more data caches is discussed below with reference to FIG. 15 if an introduction to general concepts of prefetching is needed.

Introduction to PC-Based Bayesian Learning

Generally, access-pattern-based prefetch circuitry may be configured to perform short-term spatial learning based on accesses corresponding to different offsets in a given defined address region. These types of prefetchers, however, may not provide satisfactory predictions for series of memory accesses that occur repeatedly, with the same or similar offsets, but different starting addresses. Consider, for example, an initial access based on a pointer lookup of a struct that is typically followed by offsets 4, 6, and 7 cache lines from the initial access. Address-based prefetch circuitry may fail to recognize such a pattern, because of the differences in addresses caused by the pointer lookup.

In disclosed embodiments, a Bayesian pattern engine (BPE) is tagged based on program counters (PCs) (e.g., of an instruction associated with the pointer lookup in the example above) and may provide longer-term (relative to the prefetch circuitry), PC-correlated temporal learning across maps of the prefetch circuitry. This may allow the BPE to learn a preferred starting pattern for a prefetch map or learn a preferred starting granularity for a prefetch map, for example. A BPE table may be trained based on map evictions from the prefetched circuitry. The BPE table may then be accessed to potentially provide an initial pattern for a new prefetch map based on a miss in the prefetch circuitry. Disclosed BPE techniques may advantageously improve prefetch coverage, prefetch accuracy, processor performance, processor power consumption, or some combination thereof.

As one example, the BPE may implement a table that is tagged based on a hashed PC with entries that include counters corresponding to offsets in evicted maps. The BPE may update the counter values each time a matching map is evicted, based on access categories represented in the evicted map The entries may also include fields to store granularity and granularity confidence. On a miss in the prefetch circuitry and a hit in the BPE, control circuitry may generate an initial pattern for a new prefetch map based on the counter values (assuming the granularities match) or may generate a new target granularity for the prefetch map otherwise. Detailed BPE embodiments are discussed below with reference to FIGS. 1-5.

Introduction to Compressed Storage for Demoted Access Maps

Generally, maintaining a large number of access maps for a prefetcher may be desirable to improve prefetch coverage but may be problematic in terms of area, power consumption, access speed, over-prefetching, etc.

In disclosed embodiments, compressed map storage circuitry is configured to store certain information from maps that are demoted or deactivated by prefetch circuitry and restore at least a portion of the original information when a corresponding map is activated (at least in some scenarios). Some of the information may be stored using lossy compression. Generally, the compressed map storage circuitry may store fields with long-term relevance while discarding transitory state. For example, the compressed storage may store quality factor information and pattern contents (which may be compressed) while discarding speculative parts of a map, local state such as launch state, last touch, etc. This may advantageously provide many of the advantages that could be achieved by simply implementing a larger primary prefetch map table, but with substantially lower costs, e.g., in terms of circuit area and power consumption. Detailed compressed map storage embodiments are discussed below with reference to FIGS. 6-8.

Introduction to Adaptive Adjustment of Prefetch Constraints

A processor may impose restrictions on prefetching, e.g., for certain workloads. Generally, the prefetcher may select parameters to strike a balance between prefetch depth and prefetch width. Further, certain workloads may perform better with a greater prefetch depth (e.g., workloads with a smaller number of threads) while others may potentially suffer from prefetch runaway and unused prefetches if the depth is too great.

As one specific example, prefetch circuitry may be configured to impose restrictions on memory access requests relating to matrix or vector acceleration hardware (e.g., for accelerating matrix multiplication), in some embodiments. Typically, workloads using the acceleration hardware may have a relatively large number of short threads, which may not benefit from prefetch depth. Therefore, the prefetcher may restrict access map granularity, prefetch distance, prefetch degree, or some combination thereof for certain categories of requests.

Some sub-categories of accelerated workloads, however, may not benefit from such restrictions. For example, large language model (LLM) workloads may utilize acceleration hardware but typically implement a smaller number long-running streams which may benefit from more aggressive prefetching. The prefetcher, however, may not have knowledge of the sub-category of workload or the number of active streams.

Therefore, in some embodiments, adaptive control circuitry is configured to determine the number of active prefetcher maps (which may be a proxy for the number of streams) and relax one or more restrictions on certain types of accesses in response to the number of active maps being below a threshold. This may advantageously provide aggressive prefetching for certain workloads that benefit from aggressiveness, while restricting prefetching for other workloads. Detailed adaptive adjustment embodiments are discussed below with reference to FIGS. 9-10.

Introduction to Fuzzy Pattern Matching

To improve prefetch coverage, it may be desirable to prefetch even when an access pattern does not completely match with a prefetch pattern. As one example, wildcard symbols in a stored pattern may allow matches with multiple (or all) access map pattern symbols.

In some embodiments, to provide even greater flexibility, a prefetcher is configured to initiate prefetches based on detecting a threshold level of similarity between access patterns and prefetch patterns, without or without wildcards. For example, control circuitry may determine Hamming similarity between a pre-defined prefetch pattern and an access pattern. The control circuitry may request one or more prefetches if the similarity meets a threshold. Detailed fuzzy matching embodiments are discussed below with reference to FIG. 11.

Introduction to Prefetching for Security Tag Metadata

A processor may store metadata for data blocks at a different location in an address space than the corresponding data blocks. Often the metadata is accessed and used in conjunction with the corresponding data, which may introduce challenges for a prefetcher.

As one example, secure tags such as memory tagging extension (MTE) tags may be associated with memory regions. Verification of the MTE tags may provide robustness against attacks that attempt to exploit memory safety violations. Specifically, locks may be set on memory and keys provided in conjunction with memory access. Verification may compare the key with the lock and check for a match. Violations may trigger exceptions or may be asynchronously reported. MTE tags may be stored at different addresses than the corresponding data, e.g., according to a specified equation.

In disclosed embodiments, prefetch circuitry is configured to launch prefetches of metadata based on prefetching activity for nearby data blocks, corresponding data blocks, or both. For example, the prefetcher may implement one or more flags in an access map that indicate whether secure tags have been prefetched for one or more blocks corresponding to entries in the access map (note that an access map may correspond to a portion of a block or to multiple blocks, depending on the granularity of offsets within the access map). The prefetcher may detect when prefetching approaches, reaches, or crosses a data block boundary and initiate a prefetch of metadata (e.g., secure tags) for the next block across the boundary. This may advantageously improve performance by prefetching metadata in a timely fashion in conjunction with corresponding data. It may also advantageously reduce unused prefetches, relative to prefetching metadata for surrounding blocks without considering prefetch activity within the current block. Detailed embodiments with prefetching of security tag metadata are discussed below with reference to FIGS. 12-13.

Introduction to Techniques relating to Prefetching for Multiple Cache Levels

In some embodiments, an access-map-based prefetcher may be configured to generate prefetches for multiple cache levels. Adding additional cache levels may present challenges, e.g., in efficiently utilizing bits per access pattern symbol. Further, it may be desirable not to disturb fine-tuned prefetch parameters or metrics for other caches, such as quality factors. Therefore, in disclosed embodiments, prefetch launcher state may be overloaded in pattern symbols and initial quality factor values may be carefully selected. Detailed embodiments with prefetching for additional cache levels are discussed below with reference to FIG. 14.

Example Embodiments of Supplemental PC-Based Tracking and Learning

FIG. 1 is a block diagram illustrating an example system that includes prefetch circuitry 120 and supplemental access tracking circuitry 110, according to some embodiments. As discussed above, circuitry 110 may be referred to as a Bayesian pattern engine (BPE). The following discussion provides an overview of functionality of prefetch circuitry 120, followed by an explanation of example embodiments in which supplemental access circuitry 110 learns from maps evicted from prefetch circuitry 120 and uses that learning to provide starting access maps to prefetch circuitry 120 in certain scenarios.

Prefetch circuitry 120, in the illustrated embodiment, is a pattern-based data prefetcher and stores access map data 130 based on demand accesses (and other access categories such as prefetch operations) to offsets within defined address regions and access pattern data 140 for comparison with the access maps. As shown, prefetch circuitry 120 receives address information for memory accesses. Prefetch circuitry 120 may update access map data 130 based on the accesses and launch prefetches based on matches between access maps in data 130 and stored pre-determined patterns in access pattern data 140. The prefetches may fetch data from memory into one or more cache levels (or from one cache level to another cache level), for example. Prefetch circuitry 120 may store a set of access patterns and may request prefetches based on matches between a given access map and a given stored access pattern. The logic that launches requested prefetches may be separate from the prefetch request logic.

The access map data 130 may track up to N access streams corresponding to slices of virtual address (VA) space and the offset distance represented by symbols in a given map (referred to as granularity) may be dynamically updated under certain conditions. Example symbols for access categories within an access map are discussed below with reference to FIG. 3. Prefetch circuitry 120 may also implement various additional features such as tracking quality factors for accuracy and bandwidth, chaining access maps, next-line prefetch, etc. In some embodiments, prefetch circuitry 120 is unified in the sense that it is configured to launch prefetches for multiple cache levels.

The following applications are incorporated by reference herein in their respective entireties (although in the event of any conflicts between those applications and the present disclosure, the present disclosure governs): U.S. patent application Ser. No. 13/942,780 titled "Access Map-Pattern Match Based Prefetch Unit for a Processor" and filed Jul. 16, 2013; U.S. patent application Ser. No. 15/093,213 titled "Unified Prefetch Circuitry for Multi-Level Caches" and filed Apr. 7, 2016; U.S. patent application Ser. No. 15/093,173 titled "Prefetch Throttling in a Multi-Core System" and filed Apr. 7, 2016; and U.S. patent application Ser. No. 15/435,910 titled "Prefetch Circuit with Global Quality Factor to Reduce Aggressiveness in Low Power Modes" and filed Feb. 17, 2017. These applications discuss various prefetch techniques that may be implemented by embodiments of prefetch circuitry 120.

Supplemental access tracking circuitry 110, in the illustrated embodiment, is configured to allocate or update entries based on evicted access maps from prefetch circuitry 120. As shown, circuitry 110 receives program counter information for memory accesses. As one example, the program information may be a hash of the program counter corresponding to the initial access within a given access map. Prefetch circuitry 120 may store this hashed program counter in access map data 130. In other embodiments, the program counter information may be an entire program counter or some other value derived from the program counter.

Circuitry 110 may update an entry based on multiple evictions from prefetch circuitry 120, e.g., by adjusting counter values corresponding to offsets from evicted access maps. Circuitry 110 may arm an entry based on one or more thresholds relating to counter values. On a PC-based his to an armed entry, circuitry 110 may provide a starting access map for the address region corresponding to the memory access that hit the armed entry to prefetch circuitry 120. For example, circuitry 110 may generate symbols for the starting access map based on counter values from the entry that was hit. Example symbols and counter values are discussed below with reference to FIG. 3. The starting access map may allow launching of prefetches that would not have occurred if a default starting address map had been used by prefetch circuitry 120, which may advantageously improve prefetch performance, at least for certain workloads.

FIG. 2 is a diagram illustrating an example entry in the supplemental access tracking circuitry, according to some embodiments. In the illustrated example, a given entry includes a tag 210, per-map-offset confidence counters 220, valid field 230, granularity 240, granularity confidence 250, and armed field 260.

Tag 210, in some embodiments, includes all or a portion of a hash of all or a portion of a program counter corresponding to the initial access to an access map. Prefetch circuitry 120 may provide this information to circuitry 110 in response to an access map eviction and circuitry 110 may check whether there is a tag match (e.g., to determine whether to allocate a new entry or update an existing entry). Note that some bits of the hashed PC may be used for tag 210 and other bits may be used to index into the tracking table of circuitry 110. Circuitry 110 may update confidence counters 220 (which may include a counter per offset in an access map) based on evicted maps to learn patterns associated with the PC corresponding to tag 210.

Valid field 230 indicates whether the entry is valid and armed field 260 indicates whether the entry is armed. Note that an entry may be armed based on various thresholds, e.g., corresponding to a number of counters 220 above a counter threshold, an overall sum of all the counters 220, etc. Generally, an armed entry is considered to have learned sufficiently to provide a potentially useful starting access map. In some embodiments, the armed state may be encoded as part of another field (e.g., implementing a base granularity+armed state for granularity field 240) rather than being a standalone field (and the same is true for various field encodings discussed herein).

Granularity field 240 indicates the granularity of evicted access maps. This may be useful to provide a starting access map at a higher granularity than a default access map, which may improve prefetch performance. Granularity confidence field 250 indicates the confidence in the current granularity 240 and may be used to determine when to change the granularity 240.

Note that the table implemented by access circuitry 110 to includes entries encoded according to FIG. 2 may be fully associative or may be set associative, in various embodiments. In some embodiments, a given entry may include security tag information (not shown).

FIG. 3 shows example symbols and counter values that may be used to track evictions and provide a starting access map, according to some embodiments. The illustrated example shows an example evicted map 310, counter increment vector 320 for the evicted map, access tracking entry counter values 330 after updates based on multiple evictions, and an example prefetcher starting map 340.

FIG. 3 also provides a legend for example access category symbols in an access map. Generally, when an access is performed to an address within an already-allocated map in prefetcher 120, pattern matching may occur. This may include reading out the map and aligning the map based on the last access to compare the matching side of the pattern with multiple stored patterns. Results may be sorted through a priority encoder and the match to the highest-priority stored pattern may be selected.

In this example, a "." indicates that no access has occurred to that offset in the map. An "A" indicates that an earlier demand access occurred to that offset. An "!" indicates that a prefetch is pending to the level N cache (e.g., an L1 data cache, although N may refer to various other levels in different embodiments) while an "#" indicates that a prefetch is pending to the level N+M cache (e.g., an L2 cache, L3 cache, memory cache, etc.). A "P" indicates a prefetch has been launched to a level N cache. A "3" indicates a prefetch has been launched to a level N+M cache. An "S" refers to a hit on a prefetch (where a demand request accessed a location that was already prefetched, providing the desired result of a cache hit for that demand). An "*" refers to a wildcard (note that this symbol may be used for stored access patterns, not access maps, and may be considered a match to any symbol in an access map). In this example, the "%" symbol refers to the most-recent demand access to the map. In this example, the "@" symbol refers to the initial demand access to the map. The indices within a given access pattern of the % and @ locations may be stored separately from the access pattern (although the illustrated patterns show the @ symbol for purposes of explanation).

A given stored pattern may include a left-hand matching side and a right-hand application side. The pattern matching may look at the left-hand matching side for a match with the access map and utilize the right-hand side when there is a hit, to update the access map. Pattern matching circuitry, in some embodiments is configured, for "A" or "@" symbols in the pattern to signal a match only if there is an "A" symbol in the access map. For an "." symbol in a stored pattern, the matching circuitry may signal a match for "!" "#" "3" "P" and "." symbols but not for "A" symbols in the access map. Wildcards in the pattern may be a match for any symbol in the access map. Various other matching schemes may be used for various types of access categories tracked in various embodiments.

Figure 13A:
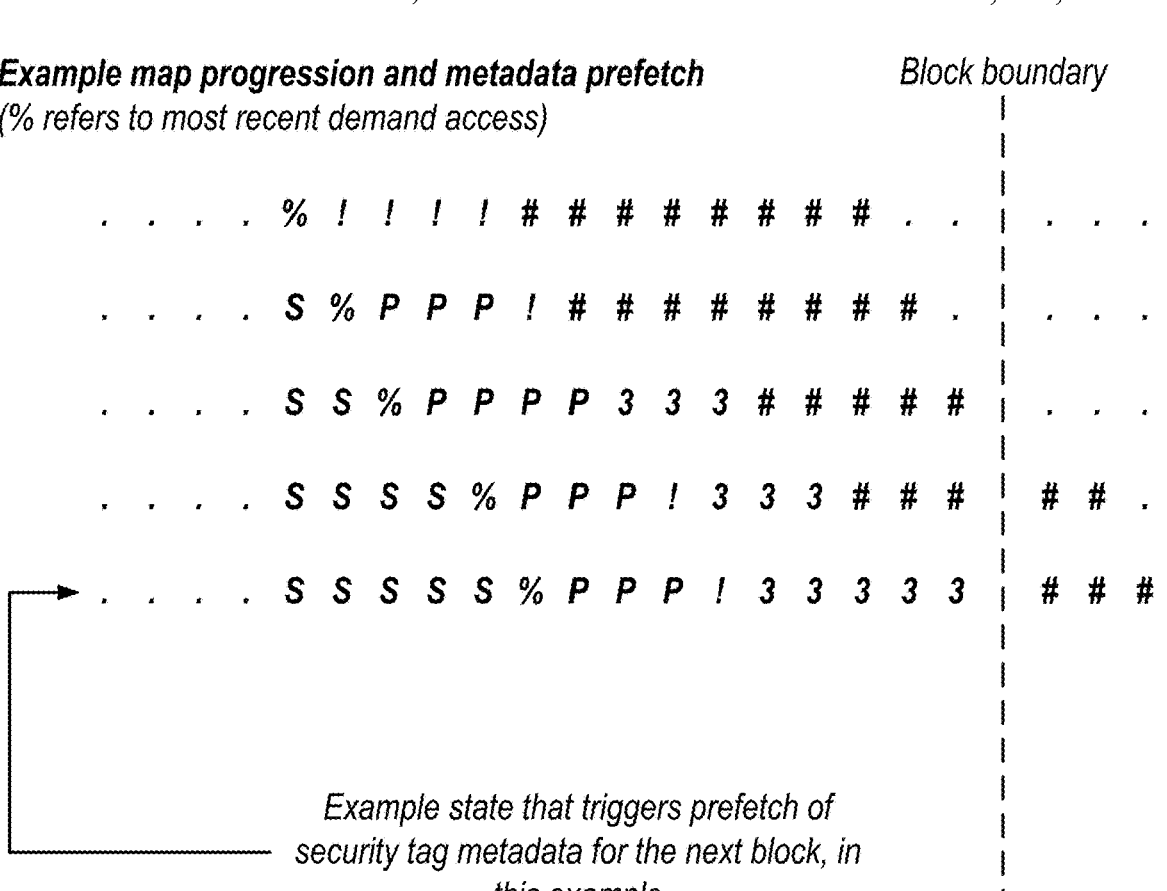
FIG. 13A is a diagram illustrating example map progression and metadata prefetch, according to some embodiments.

When there is a match for the left-hand matching side of a stored pattern, pattern application circuitry may update the matching map. For example, pattern application circuitry may insert a "!" if the stored pattern has a "P" at a given location and the map has a "." a "3" or a "#" (where a "3" or "#" in the access map may be upgraded to a prefetch to the level N cache that is closer to the execution circuitry even though another prefetch was pending or launched). Similarly, if the matching pattern has a "3" at a certain position then the map may be set to a "#" at that position if the current map contents are a ".". Otherwise, the pattern application circuitry may not update the map. Note that FIG. 13A is discussed below in the context of prefetching metadata and shows a map progression that may occur based on pattern application over multiple accesses.

Launcher circuitry may then select from pending prefetches ("!" and "#" in the map) to actually launch prefetch operations (which may change those symbols to "P" or "3" respectively once launched). In embodiments with such launcher circuitry, prefetch launches may be decoupled from prefetch requests, such that a pending prefetch may not always launch, e.g., depending on the number of requested prefetches. In other embodiments, setting a prefetch to a pending state may immediately trigger a prefetch. In some embodiments, a given map includes one or more pending launch bits that indicates whether there are any pending prefetches to one or more cache levels in a given map (which may allow the launcher circuitry to detect pending prefetches without checking all the symbols of the map). Note that prefetches to different cache levels may result in different amounts of return data, e.g., the different cache levels may have cache lines of different sizes. Further, a launched prefetch may cause prefetch of one or multiple cache lines depending on the granularity and the cache being accessed.

In some embodiments, prefetch circuitry 120 implements a density pattern, which may be pattern that will match any demand (if no other higher priority pattern matches), including the first demand that allocates a new map. The density pattern may be bidirectional. The density pattern may contain only "3" symbols (which means that it may be launch prefetches only if there is sufficient quality factor for launching prefetches to a certain cache level, as discussed in detail below).

Evicted map 310, in the illustrated example, includes multiple entries with no access (·), an initial access (@), a demand access (A), two hits on previous prefetches(S), and some launched prefetches (3). While sixteen symbols are shown, access maps of various lengths may be implemented across embodiments or within a given embodiment. Map 310 may be evicted for various reasons, e.g., based on a replacement policy such as a least-recently-used (LRU) policy among stored access maps. As discussed above, certain pointer-based accesses, for example, may have a pattern that circuitry 110 can learn but that does not access the same addresses. Therefore, map 310 may be allocated, updated, and evicted multiple times based on a repeated pattern of accesses.

Counter increment vector 320, in the illustrated example, is an example vector for adjusting counters in circuitry 110 based on the specific symbols of the evicted map 310. In this example, demand accesses and hits on prefetches cause a counter increment by three, while the other illustrated access categories cause a counter decrement by one. Generally, various counter adjustments in positive or negative directions may be associated with a given symbol or set of symbols in an evicted access map. Circuitry 110 may update confidence counters 220 of a matching entry based on the adjustments for a given evicted map.

Counter values 330, in the illustrated example, show counter values after multiple updates based on map evictions from prefetch circuitry 120. In the illustrated embodiment, the threshold for adding a ! symbol to the starting access map is a counter value of four and the threshold for adding a # symbol to the starting access map is a three (generally, higher counters values may indicate that prefetches to lower-level caches, closer to the underlying execution pipelines, may be desirable). In some embodiments, counter values may saturate at certain values in one or both directions.

In some embodiments, entries in circuitry 110 are aligned with the @ access, as shown, and look forward only. In other embodiments backwards learning may also be implemented.

Starting map 340, in this example, is populated based on the counter values and may result in more aggressive prefetching, once allocated in prefetch circuitry 120, relative to a default starting access map. For example, the map already has pending prefetches that may be picked up by the prefetch launch circuitry. Therefore, a memory access with a PC that hits in circuitry 110 may utilize the learning by circuitry 110 to reduce effective memory latency for a subsequent pattern of accesses.

FIG. 4 is a flow diagram illustrating an example method for training supplemental access tracking circuitry, according to some embodiments. At 410, in the illustrated example, the system reads out contents of an evicted access map from prefetch circuitry 120 and checks for eligibility to train in circuitry 110. This may include, for example, checking for a threshold number of valid accesses beyond the initial touch, not having chained, etc. If the evicted map does not meet the eligibility criteria, it may be ignored by circuitry 110.

At 420, in the illustrated example, circuitry 110 checks for a hit in its entries. For example, circuitry 110 may utilize part of the hashed PC as an index and another part for comparison with the tag 210 for the entry at that index. If there is a hit, flow proceeds to 440, otherwise flow proceeds to 430.

At 430, circuitry 110 allocates a new entry (which may include overwriting an existing entry at the index). Circuitry 110 may initialize counter values to initial values (which may be different for different counters, e.g., greater for counters nearest the initial touch). Circuitry 110 may also update the counter values based on symbols of the evicted map. Circuitry 110 may set the granularity to a starting default and update the granularity confidence counter based on whether the default matches the granularity value of the evicted map. Circuitry 110 may mark the entry as valid, write the new tag field, and arm the entry if the confidence counters meet a threshold.

At 440, circuitry 110 updates an existing entry, which may include updating the counters based on the evicted map if the granularities match. If the granularity of the evicted map does not match the granularity of the entry, circuitry 110 may not update the counters but may update the granularity confidence counter (and may change the granularity of the entry to match the evicted granularity if the confidence counter reaches a threshold). Circuitry 110 may reset the granularity confidence counter when the evicted granularity is lower than or equal to the stored granularity. Circuitry 110 may arm the entry if the counters updates caused the counters to meet a threshold. Multiple iterations of the method of FIG. 4 may eventually cause a given entry in circuitry 110 to become armed.

Figure 5:
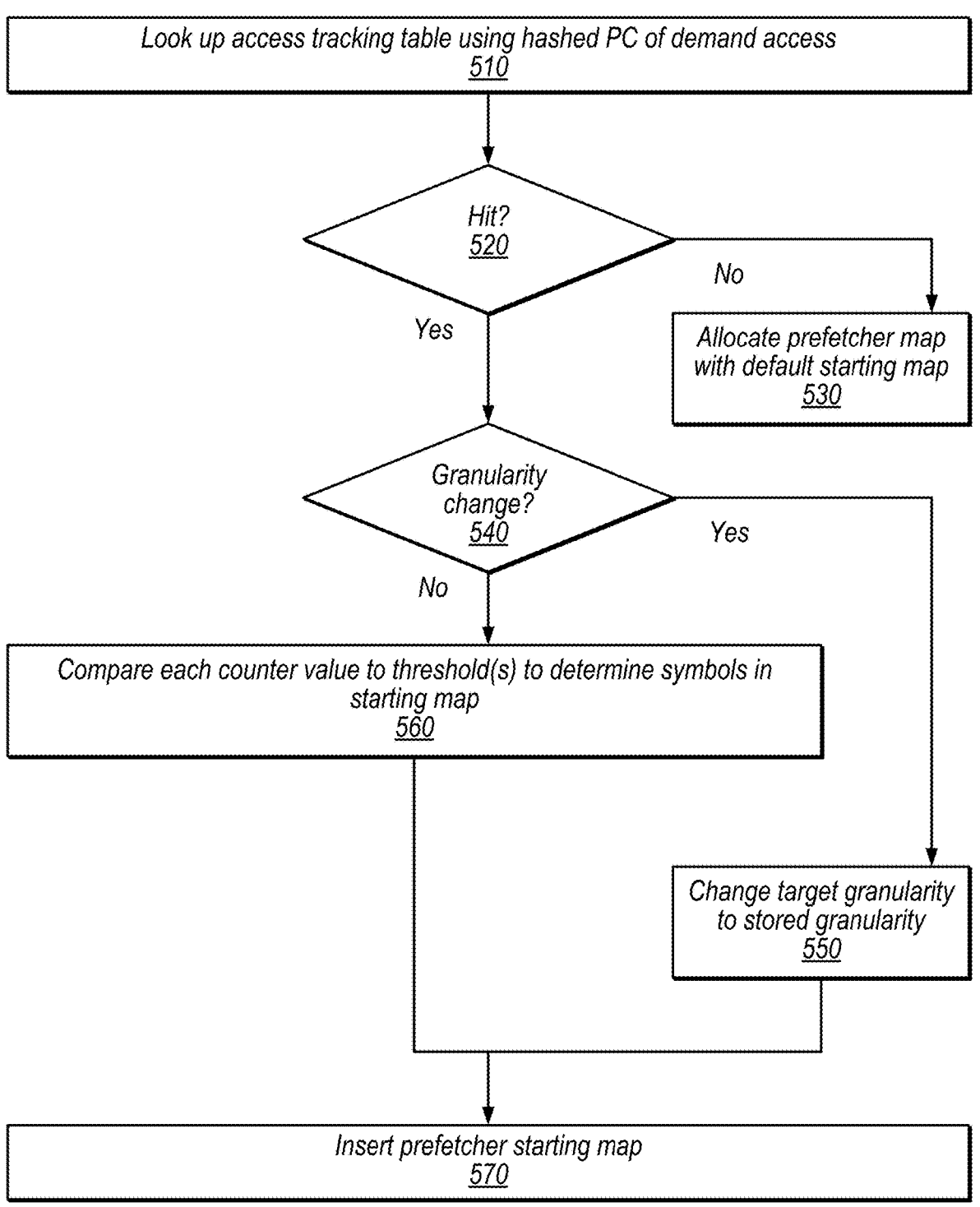
FIG. 5. is a flow diagram illustrating an example method for checking whether to utilize an entry in supplemental access tracking circuitry, according to some embodiments.

FIG. 5. is a flow diagram illustrating an example method for checking whether to utilize an entry in supplemental access tracking circuitry, according to some embodiments. At 510, in the illustrated example, the system looks up the access tracking table in circuitry 110 using the hashed PC of a demand access. Note that the system may check circuitry 110 only when there is no hit for the demand access in prefetch circuitry 120, in some embodiments. If there is a hit at 520 (e.g., there is a tag match at the relevant index and the entry is armed and valid), flow proceeds to 540. (If not, flow proceeds to 530 and prefetcher 120 allocates a map with the default starting map rather than utilizing circuitry 110).

At 540, circuitry 110 checks for a granularity change (e.g., for a granularity indicated by the hit entry in circuitry 110 that is a non-default granularity). If there is a granularity change, flow proceeds to 550 and the system changes the target granularity for a starting access map in prefetch circuitry 120 to the stored granularity from the entry in circuitry 110.

If there is not a granularity change at 540, flow proceeds to 560 and circuitry 110 compares each counter 220 to one or more thresholds to determine whether to generate pending prefetch symbols in the starting map for prefetcher 120. For example, as discussed above with reference to FIG. 3, there may be different counter thresholds for symbols corresponding to prefetches to different cache levels.

At 570, the system inserts the starting map into prefetch circuitry 120 (e.g., with the starting map symbols determined at 560 or with the target granularity determined at 550). In this manner, circuitry 110 may advantageously improve prefetch coverage by prefetch circuitry 120 using PC-based, longer-term learning.

Example Embodiments of Compressed Map Storage

As discussed above, there may be tradeoffs between increasing the number of access maps tracked by prefetch circuitry 120 and other considerations such as circuit area, power consumption, map access time, etc. Therefore, in some embodiments, compressed map storage circuitry is configured to store some data from inactive maps from prefetch circuitry 120. This may retain certain prefetch information with more limited increases in circuit area and power consumption. Generally, the compressed map storage may store information with potentially long-term relevance such as access patterns, quality factor data, granularity data, etc., while discarding transitory data such as metadata for up-switching granularity, etc.

Figure 6:
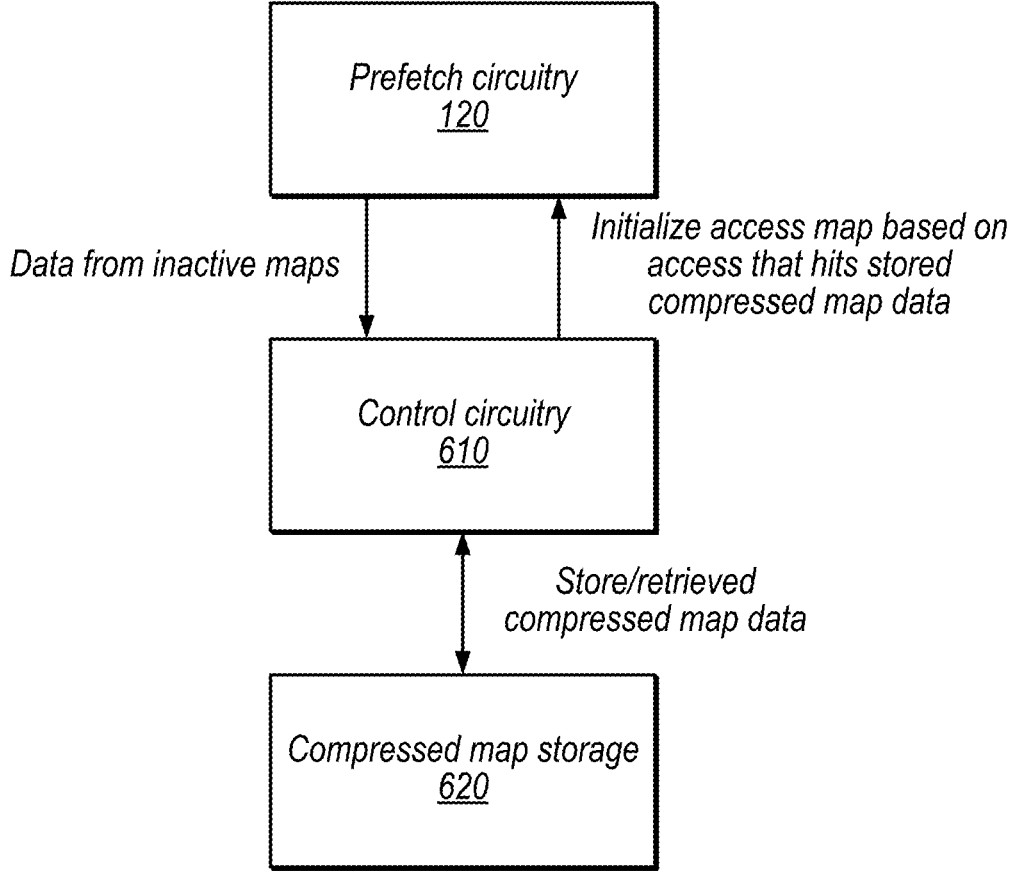
FIG. 6 is a block diagram illustrating example compressed map storage circuitry, according to some embodiments.

FIG. 6 is a block diagram illustrating example compressed map storage circuitry, according to some embodiments. In the illustrated embodiment, the system includes prefetch circuitry 120, control circuitry 610, and compressed map storage 620. When a map becomes inactive from prefetch circuitry 120 (e.g., due to an eviction to make room for another map), control circuitry 610 is configured to save a portion of the map data (which may include not saving certain fields at all, saving some fields as-is, and storing compressed versions of some fields). Control circuitry 610 is configured to store the saved portion in compressed map storage circuitry 620. In response to a hit for a demand access in compressed map storage 620, control circuitry 610 may promote the entry and initialize an access map in prefetch circuitry 120 based on the stored information from storage 620.

Access maps may be tagged based on addresses of accesses and the prefetch table of circuitry 120 and compressed map storage table of circuitry 620 may utilize the same tag format or different tag formats. In some embodiments, the tags are portions of virtual addresses associated with memory accesses. When there is a miss in prefetch circuitry 120 for a given access, control circuitry 610 may check for a hit in compressed map storage 620. If there is a hit, control circuitry 610 may promote the hit entry, as discussed above. As discussed in detail below, control circuitry may maintain replacement information (e.g., an LRU stack) separately for the prefetch table and compressed map storage table, or monolithically across both tables. Therefore, control circuitry 610 may select a map for demotion from prefetch circuitry 120 based on the replacement information and store the demoted map in compressed map storage 620. Demotion may be needed to make room either for a newly allocated map in prefetch circuitry 120 and for a map promoted from compressed map storage 620.

Figures 7A, 7B, 7C:
FIG. 7A is a diagram illustrating fields of an example entry in prefetch circuitry, according to some embodiments.
FIG. 7B is a diagram illustrating fields of an example entry in compressed map storage, according to some embodiments.
FIG. 7C is a diagram illustrating example map symbols and compressed representations, according to some embodiments.

FIG. 7A is a diagram illustrating fields of an example entry in prefetch circuitry 120, according to some embodiments. In the illustrated example, a given entry in prefetch circuitry 120 includes access map data 710, quality factor data 720, granularity field 730, granularity up-switch metadata 740, and granularity least-recently-used (LRU) control counters 750. Generally, some fields of the prefetch entry may be omitted or compressed when demoted to compressed map storage 620, as shown and discussed below with reference to FIG. 7B.

Access map data 710, in some embodiments, includes an array of symbols corresponding to offsets within a predefined address region, e.g., as discussed above with reference to FIG. 3. The symbols may track accesses of various categories, including demand accesses, prefetch launches, pending prefetches, wildcards, hits on prefetches, no access, etc.

Quality factor data 720, in some embodiments, provides limits on prefetch aggressiveness. Generally, one limit on prefetch runaway may correspond to the greatest pattern length stored by the prefetcher. In addition, one or more quality factors may trigger prefetch slowdowns when prefetches are not being consumed. In prefetchers with prefetching to multiple levels, quality factors may be split, e.g., into an accuracy quality factor (AQF) and a bandwidth quality factor (BQF). The AQF may apply to all prefetches regardless of level while a given BQF may be for one cache level (e.g., a last-level cache) and may gate only launching of prefetches from that cache. The quality factors may utilize a token bucket algorithm to track prefetch consumption and prefetches may be gated when tokens reach a certain threshold.

Granularity field 730, in some embodiments, indicates the granularity of the access map data (e.g., the distance in address space between offsets in the map). When the granularity changes, the previous map data 710 may be discarded and the access map data 710 re-initialized.

Granularity up-switch metadata 740, in some embodiments, is tracked to determine when to up-switch a map to a higher granularity. In some embodiments, maps are initially created at the lowest granularity (which may be referred to as gran0). Certain bandwidth streaming situations or pieces of code may benefit from larger maps at higher granularities, however. Therefore, the prefetcher may up-switch maps (e.g., to gran1, gran2, etc.) in certain scenarios. This up-switch may be based on various input factors, such as occurrence of data cache misses, the length of one or more recently matched patterns, the pattern stride, noisiness of the pattern (e.g., with wildcards embedded in the match size or very large stride patterns), etc. Granularity up-switch metadata 740 may track various information associated with these input factors.

Granularity least-recently-used (LRU) control counters 750, in some embodiments, are used to limit granularity up-switching to a certain granularity level in some situations. Example control techniques that may utilize counters 750 are discussed below with reference to FIG. 8B. For example, counters 750 may track the demotion of a given access map to LRU position Y and may prevent up-switching to granularity X based on a counter threshold corresponding to that granularity. Separate counters, limits, or both may be maintained for different granularities. A given counter may be increased by a certain value when a map demotes to a certain LRU position and decremented every time a map is touched (a demand access modifies the map) when the map is above the corresponding threshold LRU value, for example. This tuning may advantageously avoid undesirable granularity increases.

FIG. 7B is a diagram illustrating fields of an example entry in compressed map storage 620, according to some embodiments. In this example, a given entry stores compressed map data 712, quality factor data 722, granularity 732, and compressed granularity LRU control counters 752.

As shown, compressed map storage 620 does not store the granularity up-switch metadata 740 from a demoted prefetch entry in this example. This may advantageously avoid artificial granularity increases from maps being demoted to storage 620 and subsequently promoted, which might interfere with sensitive prefetch tuning parameters. Instead, the up-switch metadata 740 is re-initialized when a map is promoted back into the prefetcher.

Generally, one or more other prefetch entry fields (not shown) may also be omitted from the compressed map storage 620. Still other fields may be included in both prefetch map data and compressed map storage, e.g., the quality factor data, and granularity data (shown as 722 and 732 in the illustrated example which may correspond directly to fields 720 and 730 from the prefetcher). Still other fields may be compressed in the compressed map storage.

For example, compressed access map data 712, in some embodiments, is a compressed version of access map data 710. The compression may be lossy. For example, certain symbols in access map 710 may not have corresponding symbols in the compressed representation (e.g., due to using a smaller number of bits per symbol). Referring to FIG. 7C, in this example the "." "!" and "#" symbols in an access map 710 are all represented as a "." in the compressed access map data 712. Similarly, the symbols "A" and "S" are both represented as "A" in the compressed representation. Thus, some transient data such as pending prefetches and hits on prior prefetches is not preserved.

When a map is promoted from compressed storage 620 to the prefetch table, control circuitry may generate a starting prefetcher access map, e.g., by merging a default pattern with the compressed access map data 712. In this manner, the starting access map after demotion may be more accurate and may prefetch more aggressively, relative to starting from scratch without the information in the entry of compressed storage 620.

Compressed granularity LRU control counters 752, in the illustrated embodiment, are a quantized version of the counter 750 from a prefetch entry (e.g., retaining the N most-significant bits and discarding additional bits, which may lose some precision but may allow for decode and populating the counter 750 with a roughly accurate value when an entry is promoted back into the prefetcher array). FIG. 8B is discussed in detail below and provides a more detailed explanation of counter use.

Note that the various fields and encodings of FIGS. 7A-7C are included for purposes of illustration but are not intended to limit the scope of the present disclosure. Rather, various access map fields from the main prefetch table may be omitted, included at original precision, or compressed for storage in circuitry 620. Further, various compression formats and encodings may be utilized.

Figure 8A:
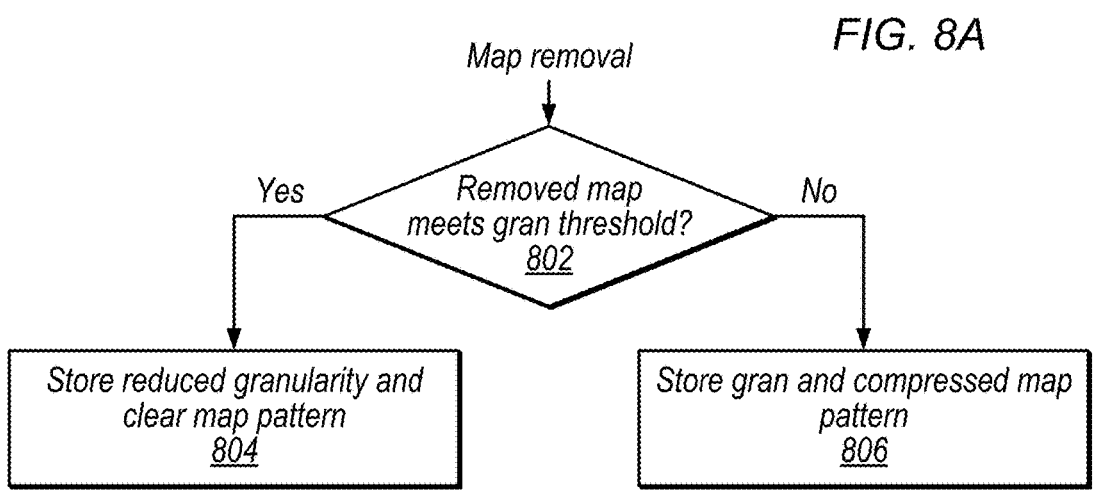
FIG. 8A is a flow diagram illustrating example techniques for down-switching granularity on demotion for certain maps, according to some embodiments.
Figure 8B:
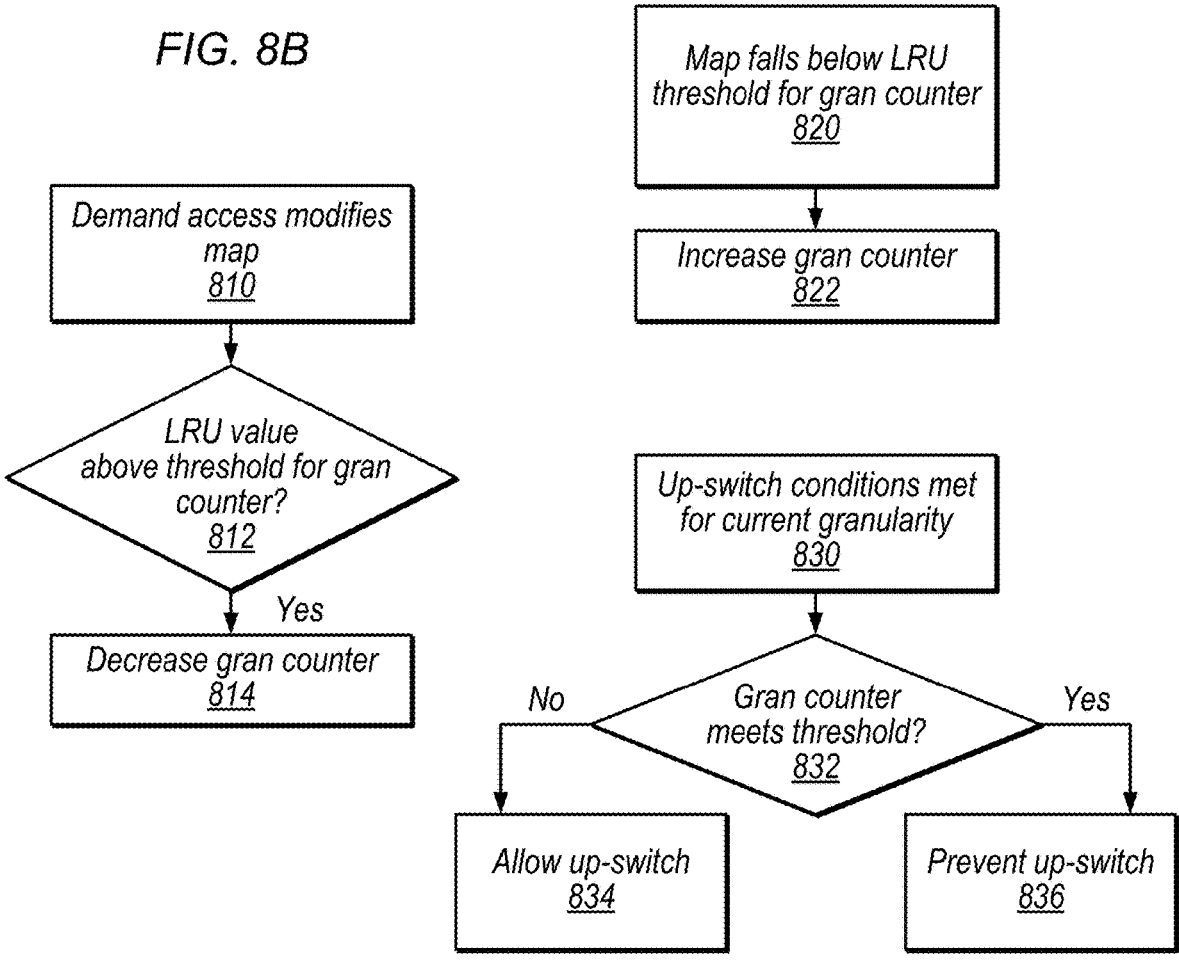
FIG. 8B is a flow diagram illustrating example techniques for limiting granularity up-switch based on demotion count to an LRU position, according to some embodiments.

FIG. 8A is a flow diagram illustrating example techniques for down-switching granularity on demotion for certain maps, according to some embodiments. This may be an additional technique for reducing or avoiding issues with demoted maps causing unwanted granularity increases when subsequently promoted, in some embodiments. In the illustrated embodiment, an access map is removed from prefetch circuitry 120 (e.g., demoted to circuitry 620). If the removed map meets a granularity threshold at 802, flow proceeds to 804 and control circuitry stores a reduced granularity (e.g., granN−1 if granN is the threshold granularity) in circuitry 620 and clears the map pattern (e.g., storing a cleared or default array of offsets in compressed access map data 712).

If the granularity does not meet the threshold at 802, flow proceeds to 806 and the control circuitry stores the granularity (e.g., in field 732) and the compressed map pattern (e.g., in field 712) in circuitry 620. In some embodiments, setting a threshold granularity for demoted access maps may reduce or prevent prefetch runaway.

FIG. 8B is a flow diagram illustrating example techniques for limiting granularity up-switch based on demotion count to an LRU position (e.g., using the counters 750 and 752), according to some embodiments. At 810, in the illustrated embodiment, a demand access modifies a map. Note that this may be a modification to a map in prefetch circuitry 120 or a compressed map in compressed map storage 620, in some embodiments (and the latter case may cause promotion of the map back into prefetch circuitry 120).

At 812, control circuitry determines whether the LRU value for the modified map is above a threshold for granularity counters (note that counters may be implemented for multiple granularities with multiple different LRU thresholds). If so, flow proceeds to 814 and the control circuitry decreases the granularity counter. (If not, the control circuitry may take no action related to the granularity control counters for the demand access). Decreasing the counter, in these embodiments, may reduce the likelihood that the control circuitry will limit up-switching.

At 820, a map falls below an LRU threshold for a granularity counter. In response, the control circuitry increases the granularity counter at 822. Note that the amount of the increase at 822 may be different (e.g., greater) than the amount of the decrease at 814. Further, the amount of increase/decrease for a given event may be different for different granularity counters. Note that increasing the granularity counter may increase the likelihood that the control circuitry will limit up-switching.

At 830, control circuitry determines that up-switch conditions are met for the current granularity, e.g., based on granularity up-switch metadata 740. If the granularity counter for the current granularity meets a counter threshold (e.g., based on increases at 822), the control circuitry prevents the up-switch at 836 (although the up-switch may later be permitted if the up-switch conditions remain met and the granularity counter falls below the counter threshold). Otherwise, flow proceeds to 834 and the control circuitry allows the granularity up-switch. In this manner, granularity up-switching may advantageously be limited for access maps that frequently fall below a certain LRU threshold, which may reduce or avoid undesirable prefetches that would likely not be useful.

In some embodiments, a monolithic LRU stack is maintained across the access map table in prefetch circuitry 120 and the compressed table in circuitry 620. In these embodiments, falling below a certain LRU threshold may result in demotion to circuitry 620. The LRU thresholds for different granularity counters may be different than the LRU value corresponding to demotion, however.

In some embodiments, when promoting an entry from compressed map storage 620 to prefetch circuitry 120, control circuitry 610 may not assign the promoted entry to the most-recently-used position in the LRU stack. Rather, control circuitry 610 may select an artificial LRU value, e.g., in the middle of the LRU stack values associated with prefetch circuitry 120.

Note that a map removed from prefetch circuitry 120 may be both compressed for storage in storage 620 and may allocate/update an entry in circuitry 110. In some embodiments, control circuitry may check for a hit in circuitry 620 only if there is a miss for the memory access in prefetch circuitry 120. In some embodiments, circuitry 620 has priority over supplemental access tracking circuitry 110 if there are hits in both (e.g., circuitry 620 will provide starting information for a new entry in prefetch circuitry 120 rather than circuitry 110, when both are hit).

In some embodiments, compressed map storage circuitry 620 implements three content-addressable memories (CAMs) configured to independently determine hits and misses, e.g., at least partially in parallel. For example, one CAM may check for hits in storage 620 based on misses in prefetch circuit 120. Another CAM may check for hits and misses in storage 620 to invalidate an entry in storage 620 based on a granularity change for an overlapping access map in the prefetch circuitry. Still another CAM may check for hits and misses in storage circuitry 620 to invalidate an entry in storage 620 when chaining for an access map in the prefetch circuitry overwrites a portion of the access map that overlaps with the entry. Chaining refers to overwriting an older portion of an access map based on new accesses, which may correspond to movement of the address region corresponding to the access map. As one example, access maps may be tagged with multiple virtual addresses corresponding to different portions of the map, and new accesses may allow overwriting the oldest portion of the map and changing its corresponding tag. As stated above, this may cause invalidation of an entry in storage 620 when the chained access map moves into the same address area as the entry in storage 620. In other embodiments, separate CAMs may not be used for different types of occupancy checks, which may reduce circuit area, potentially at the cost of performance.

Example Embodiments of Adaptive Adjustment of Prefetch Constraints

As briefly introduced above, prefetch circuitry may adaptively adjust prefetch constraints for different workloads and may detect those workloads using various techniques. In some embodiments discussed in detail below, prefetch circuitry may deduce certain categories of workloads without an explicit indication, e.g., based on the number of active access maps in the prefetch table of prefetch circuitry 120. This may advantageously allow adaptive adjustments of prefetch constraints to tune prefetching for certain workloads (e.g., in terms of prefetch breadth versus depth).

Figure 9:
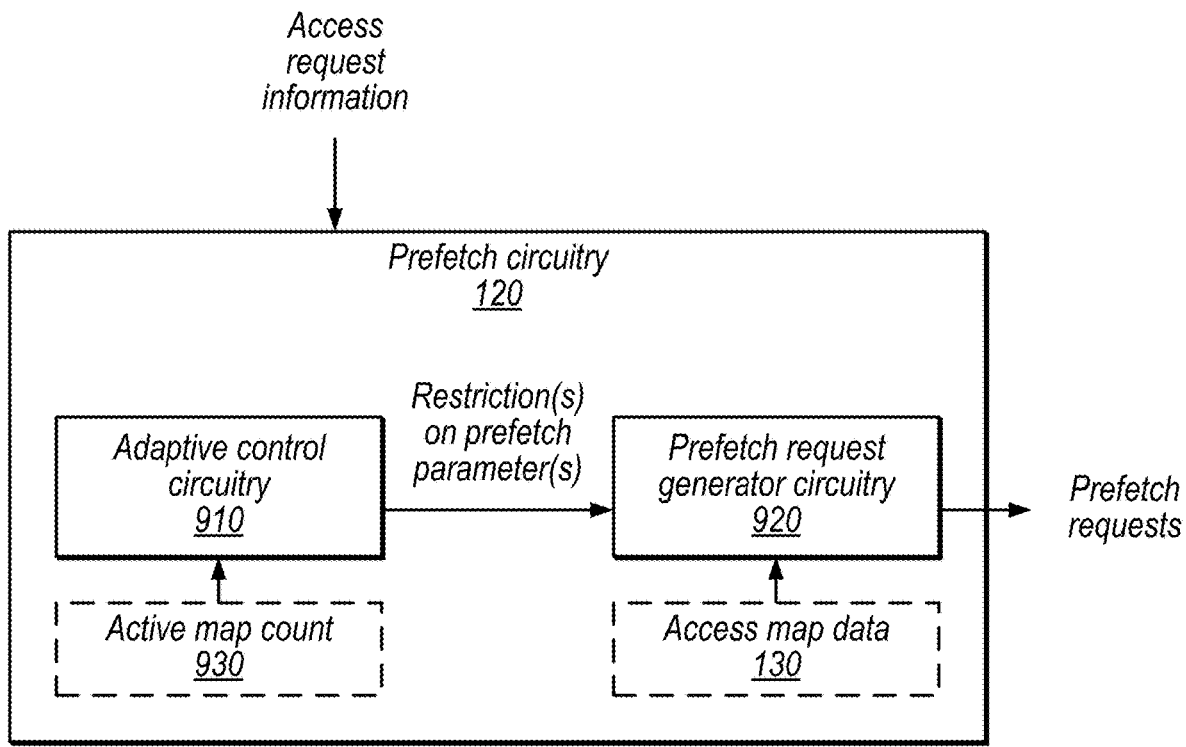
FIG. 9 is a block diagram illustrating example prefetch circuitry with adaptive control of prefetch restrictions, according to some embodiments.

FIG. 9 is a block diagram illustrating example prefetch circuitry with adaptive control of prefetch restrictions, according to some embodiments. In the illustrated example, prefetch circuitry includes adaptive control circuitry 910 and prefetch request generator circuitry 920.

Adaptive control circuitry 910, in some embodiments, is configured to access information indicating an active map count 930 and provide one or more restrictions on prefetch parameters to the prefetch request generator circuitry 920 based on the active map count. Example circuitry for tracking the count of active maps is discussed below with reference to FIG. 10.

Note that the restrictions may be only for certain types of access requests. For example, prefetch circuitry 120 may maintain separate access maps for certain types of requests (e.g., from certain accelerator or execution circuitry, and may track these access maps using an access map category field in a given access map, for example, that indicates whether the access map was trained by a particular category of workload). Prefetching for other categories of accesses are not restricted by adaptive control circuitry 910, in some embodiments.

Prefetch request generator circuitry 920, in the illustrated embodiment, is configured to examiner access map data 130 and launch prefetches based on symbols in the access map data (e.g., for the "!" and "#" symbols). Circuitry 920 may also be referred to as prefetch launch circuitry. In some embodiments, control circuitry configured to update the access map data 130 may also receive one or more restrictions from adaptive control circuitry 190. Generally, prefetch restrictions may be imposed on matching, pattern application, prefetch launches, or some combination thereof. The active map count 930 may be encoded or derived from access map entries themselves or may be maintained separately.

A granularity restriction is one example of a restriction imposed by adaptive control circuitry 910 in some embodiments. For example, for certain types of workloads, adaptive control circuitry may impose a granularity threshold and certain access maps may not be allowed to up-switch their granularity above the threshold (even if the granularity up-switch metadata 740 would otherwise cause an up-switch, for example). When the number of active maps indicated by count 930 does not meet a threshold, however, adaptive control circuitry 910 may relax the restriction and allow granularity up-switch beyond the threshold. This may allow LLM workloads, for example, with a small number of long-running streams, to aggressively prefetch by up-switching access map granularity to a greater granularity than for other types of matrix-heavy workloads. Note that stream attributes may not be visible to prefetch hardware, in various embodiments.

Note that relaxation of a given restriction may reduce the restriction or eliminate the restriction. For example, in a system that supports granularity levels gran0 through gran2 where the initial restriction does not allow increases above gran0, relaxing the restriction could include eliminating the restriction (allowing up-switch to any granularity, including gran1 or gran2) or reducing the restriction (e.g., allowing up-switch only to gran1).

Prefetch distance is another example of a restriction imposed by adaptive control circuitry 910 in some embodiments. The prefetch distance restriction may prevent prefetch request generator circuitry 920 from launching prefetches to locations that are more than a threshold distance from the most recent demand access to an access map in address space. Therefore, restricting this distance may directly impact prefetch depth. Note that a restriction on prefetch depth may alternatively be imposed at the pattern application stage be refraining from updating access map symbols to "prefetch pending" states when they are more than a threshold distance from the most recent demand access. When the active map count 930 does not meet a threshold, adaptive control circuitry may relax one or more restrictions on prefetch depth.

Prefetch degree is another example of a restriction imposed by adaptive control circuitry 910 in some embodiments. Prefetch circuitry 120 may implement one or more of various techniques to prefetch for stride patterns where accesses by a stream may be separated in address space but follow a pattern based on the stride distance. The prefetch degree refers to the number of strides ahead of a most recent demand access. As discussed above for prefetch distance, restrictions on prefetch degree may be imposed at the pattern update stage, the prefetch launch stage, or some combination thereof. When the active map count 930 does not meet a threshold, adaptive control circuitry 910 may relax a restriction on prefetch distance.

In other embodiments, explicit signaling may inform adaptive control circuitry 910 of the number of active streams for a given workload category, rather than circuitry

910 deducing this information based on active map count. For example, the explicit signaling may use a software-generated semaphore value or sideband information such as a compiler hint or a signal from execution pipelines. In these embodiments, various disclosed techniques for relaxing prefetch restrictions may be performed based on such explicit signaling, in addition to or in place of map-count-based relaxation of restrictions.

Figure 10:
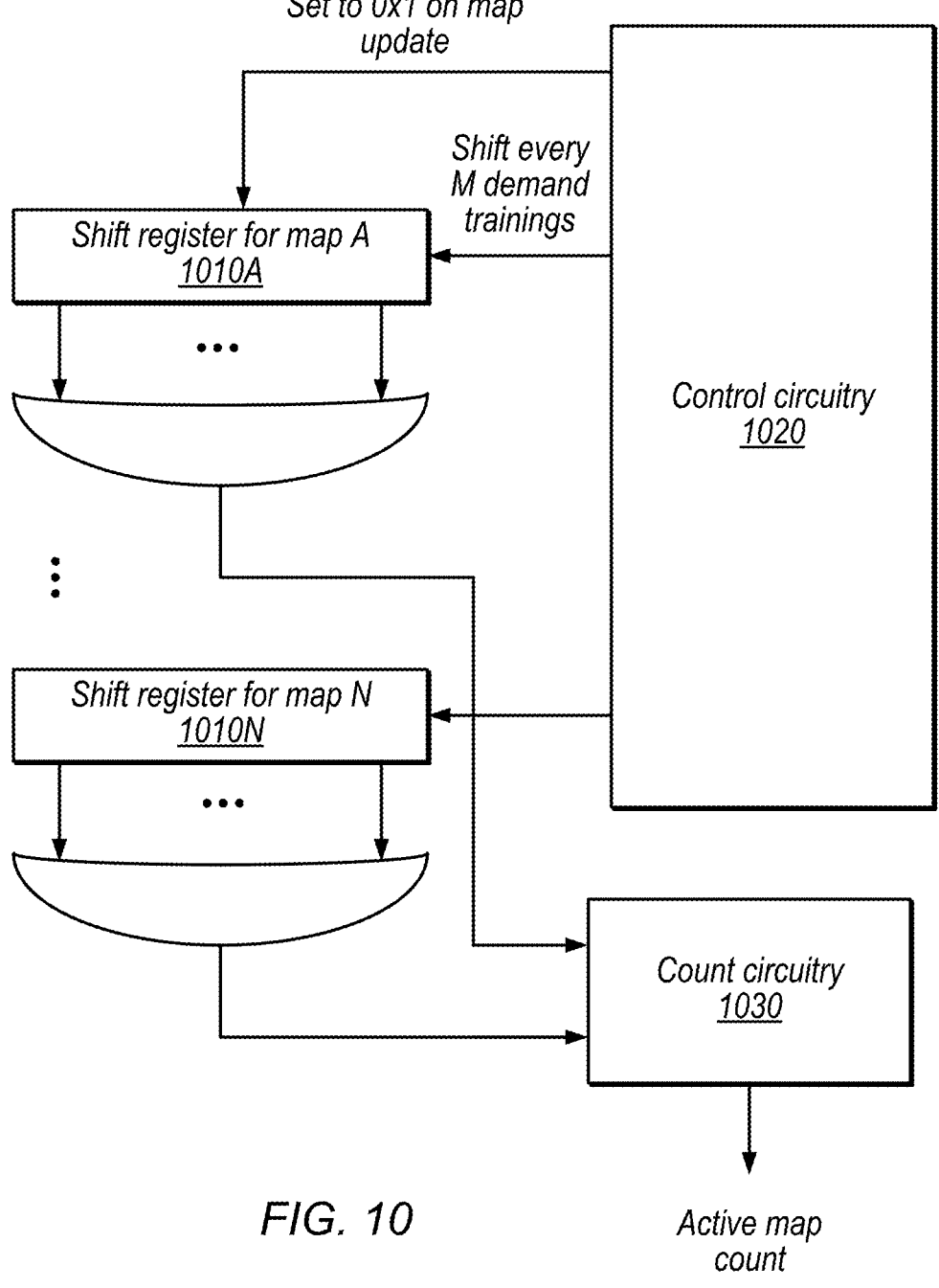
FIG. 10 is a block diagram illustrating example circuitry configured to count active maps, according to some embodiments.

FIG. 10 is a block diagram illustrating example circuitry configured to determine the count of active maps, according to some embodiments. Note that the criteria for a map to be considered "active" may vary in different embodiments and various control circuit implementations may be utilized to track thresholds for such criteria. The disclosed examples are included for purposes of illustration but are not intended to limit the criteria for a map to be considered active. In the illustrated example, the prefetch circuitry 120 includes shift registers 1010A-1010N (e.g., one register per map), control circuitry 1020, and count circuitry 1030.

In this example, a map is considered active whenever there are any bits set in its corresponding shift register. Control circuitry 120, in the illustrated embodiment, is configured to set the shift register to 0x1 (e.g., 0's in all positions except the least significant bit) each time the corresponding map is updated (e.g., corresponding to a demand access to that map). Further, control circuitry 120 is configured to shift all of the shift registers 1010 every M demand trainings (of any map in the prefetch table). Therefore, if a map is not updated over many cycles, eventually its set bit will shift out and the logical OR of the shift register contents will have a value of zero, corresponding to an inactive map.

Count circuitry 1030, in some embodiments, is configured to count the number of non-zero shift registers 1010, which corresponds to the active map count. In this manner, the illustrated circuitry may deduce when a current workload would benefit from relaxation of prefetch restrictions based on the number of active maps.

Note that the active map count may be maintained across all maps in the prefetch table or among only a certain type of map (e.g., only maps accessed by accelerated matrix/vector operations). Maintaining the count across all maps may be beneficial, in some embodiments. For example, even when a workload would normally benefit from relaxed prefetch constraints (e.g., an LLM workload), there may be other workloads operating in parallel and keeping certain constraints in place may avoid interfering with prefetches for the other work. In some embodiments, active map counts may be tracked at different granularities than individual maps (e.g., quantized), which may achieve various advantages discussed herein with reduced control signaling.

Example Embodiments of Fuzzy Pattern Matching

As briefly discussed above, disclosed pattern matching circuitry may indicate a match between an access map pattern and a stored pattern based on a threshold similarity level, even when there is not an exact match. This may advantageously improve prefetch coverage in certain scenarios, e.g., increasingly aggressive out-of-order memory accesses.

Figure 11:
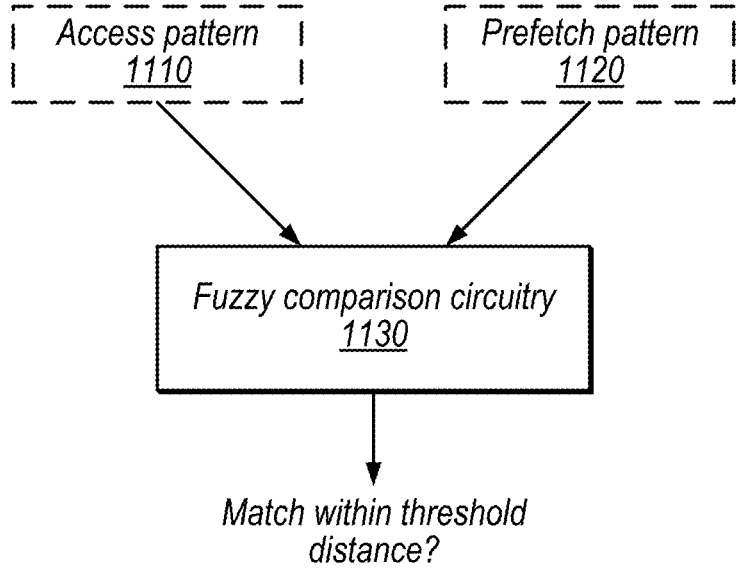
FIG. 11 is a diagram illustrating example fuzzy comparison circuitry, according to some embodiments.

FIG. 11 is a diagram illustrating example fuzzy comparison circuitry, according to some embodiments. In the illustrated example, circuitry 1130 compares an access pattern 1110 with a prefetch pattern 1120 and indicates whether there is a match within a threshold distance.

Fuzzy comparison circuitry 1130, in some embodiments, is configured to calculate similarity between an access pattern and a stored pattern using Hamming similarity. In these embodiments, two symbols at a given position in the patterns being compared either match or not (a binary outcome). Note that the matching criteria for two symbols being compared may not require an exact match, e.g., a wildcard in the stored pattern may be considered a match with any corresponding symbol in an access map. Further, certain symbols may have multiple matches. For example, a "." in the pattern may be considered a match with various map symbols such as ".", "!", "#", "3" and "P" but not an "A"). In contrast, an A in the pattern may be considered a match only with an A in the map.

As one example, the Hamming similarity for a given map pattern of 10 symbols would be 80% if 8 out of the 10 symbols match the symbol at the same index in the stored pattern. For a map that meets a threshold Hamming similarity, pattern application circuitry may perform pattern application, e.g., to generate one or more updates to the map such as changing symbol(s) to prefetch pending.

When there are hits for multiple patterns and one or more are based on fuzzy comparisons and one or more are based on non-fuzzy comparisons (e.g., have a 100% match), a default arbitration priority scheme may be enforced to select which pattern to apply (e.g., the longer pattern) in some embodiments. In other embodiments, whether the hit is fuzzy may be an input to the arbitration decision (e.g., non-fuzzy hits may take priority over fuzzy hits, or may generally be weighted higher).

Example Embodiments of Metadata Prefetching

As briefly discussed above, prefetch circuitry 120 is configured to launch prefetches of metadata (e.g., MTE tags) in addition to data for corresponding data blocks, in some embodiments. The metadata may be stored non-contiguously with corresponding data blocks and therefore may not be automatically prefetched with the data blocks according to traditional prefetch techniques. Prefetch circuitry 120 may monitor prefetch progress within a data block to determine when to prefetch metadata for neighboring data blocks (e.g., when approaching a data block boundary).

FIG. 12A is a diagram illustrating a logical view of an example data block 1220 and its corresponding metadata 1210. FIG. 12B is a diagram showing how the data block 1220 and its metadata may be stored at different locations in address space. Note that there may be a predefined relationship between the location of the metadata and a given data block in the address space.

FIG. 12C illustrates an example access map with metadata prefetch indicators for data blocks in the address range associated with an access pattern, according to some embodiments. In the illustrated example, an access map entry includes multiple metadata prefetched indicators 1230A-1230N, an access pattern 1240, and other map data 1250 (which may include various other map data discussed herein).

A given metadata prefetched indicator 1230 indicates whether metadata has been prefetched for a given block. If the metadata has not been prefetched for a block and progression through the access pattern 1240 approaches the block boundary, control circuitry may prefetch the metadata for one or more neighboring blocks.

Depending on the granularity used for the access pattern 1240, its address range may correspond to one data block or multiple data blocks (or even a portion of a data block, in some implementations). In some embodiments, a given entry supports a number of metadata prefetched indicators 1230 that is sufficient to track the greatest number of data blocks that access pattern 1240 could cover (e.g., at its greatest granularity). A portion of the indicators may remain unused for lower granularities. A given indicator 1230 may be a single bit that indicates whether metadata has been fetched for the corresponding data block. The granularity field (e.g., field 730 of FIG. 7A) may be used to determine which indicators are relevant for a given access map.

FIG. 12D is a block diagram illustrating example security tag prefetch control circuitry, according to some embodiments. In the illustrated example, security tag prefetch control circuitry 1260 receives access pattern data with metadata prefetch indications. Based on the state of a given access pattern and its metadata prefetch indications, circuitry 1260 may request prefetch of metadata for a data block. Metadata prefetches may be handled (e.g., queued) separately from prefetches for data blocks or handled together.

FIG. 13A is a diagram illustrating example map progression and metadata prefetch, according to some embodiments. In the illustrated example, the "%" symbol refers to the most recent demand access, which may be tracked in a field of the access map. As shown, pending prefetches ("!" or "#") may cause prefetch launches ("P" or "3") to different cache levels. Various launched prefetches may provide hits ("S") on prefetched data.

The dashed line in this example is the boundary between different data blocks that have corresponding MTE tags at different locations, for example. As pending prefetches, launched prefetches, or both approach or cross the boundary, circuitry 1260 may trigger prefetch of the next block across the boundary (note that this may occur in both directions, in the address space, in some embodiments, although only the forward direction is shown in this example).

In the illustrated example, the prefetch of the security tag metadata for the next block is triggered with three prefetches to one cache level pending into the next block, a prefetch to a lower cache level immediately to the left of the boundary, and a demand access within ten offsets of the boundary. (Note that the prefetch may also be based on a metadata prefetched field 1230 indicating that metadata for the next block has not yet been prefetched). In this example, the prefetch is triggered because the left-most # symbol resides in the next block. The conditions for triggering a metadata prefetch may vary in different embodiments. For example, the conditions may be based distance of one or more pending/launched prefetches to the boundary, distance of the most recent demand access to the boundary, number of pending/launched prefetches near or across the boundary, etc., or some combination thereof. These conditions may be programmable, e.g., for tuning to provide prefetch performance for new workloads.

Note that disclosed techniques may prefetch circuitry tag metadata based on demand accesses and prefetch activity (or more generally, categories of accesses) within a data block for which security tag metadata has already been prefetched. For example, multiple accesses may occur within a data block before conditions are satisfied to predict that accesses will cross the boundary into the next block, which may trigger prefetch of security tag metadata for the next block. This may advantageously reduce over-prefetching, relative to techniques that simply prefetch security tag metadata for nearby blocks based on any access to a block (in contrast to fine-grained tracking of accesses within the block).

Figure 13B:
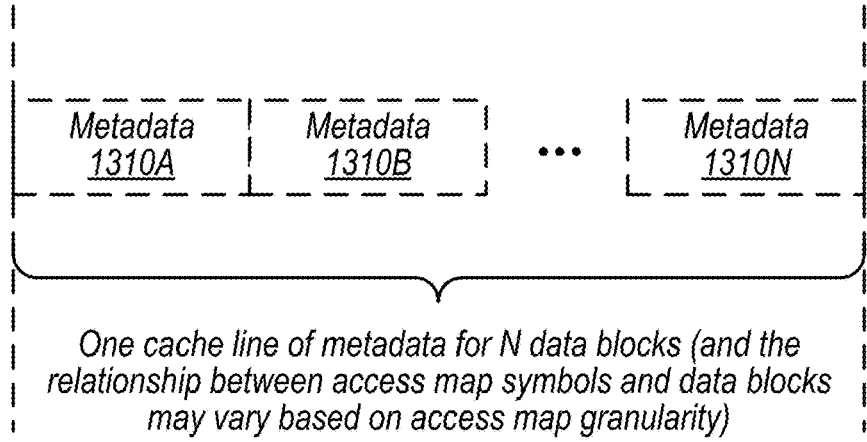
FIG. 13B is a diagram illustrating a scenario where a cache line stores metadata for multiple data blocks, according to some embodiments.

FIG. 13B is a diagram illustrating a scenario where a cache line stores metadata for multiple data blocks, according to some embodiments. Note that a prefetch may cause a prefetch of a full cache line of metadata, which may provide metadata for multiple data blocks. Therefore, a metadata prefetch performed based on approaching a block boundary may cause an update to multiple metadata prefetched fields 1230 when the metadata for those blocks is prefetched. Therefore, the security tag prefetch when approaching a block boundary may be for multiple blocks in addition to the block next to the boundary (e.g., because multiple security tags may be stored in a given cache line).

In some embodiments, to prefetch security tag data, prefetch circuitry 120 may track instructions that it would normally not track and may even prefetch tags for instructions for which corresponding data is not prefetched. Examples of such instructions include non-temporal accesses and zero-by-virtual-address (ZVA) operations. In these embodiments, prefetch circuitry 102 may track such operations using access maps and prefetch tags in response to approaching boundaries, as discussed above.

In some embodiments, the processor is configured to track criticality information for data cache lines. Critical cache lines may be identified based on dependencies, e.g., predictions that data on those lines is needed for subsequent instructions on a critical path. Particularly, it may be important to retain cached data corresponding to instructions at the head of a load queue or an instruction cache miss queue. Critical cache lines may be prioritized for retention over non-critical lines. For example, critical lines may not be considered for eviction at all in certain scenarios or the criticality may be an input weight to arbitration based on multiple retention parameters. Note that the processor may not have a notion of criticality for security tag data, however.

Therefore, in some embodiments, prefetch circuitry 120 is configured to provide artificial criticality values for cache lines with prefetched security tags to provide desired retention characteristics for security tag data (and the artificial criticality values may or may not differ from the criticality values for the corresponding data blocks).

In some embodiments, e.g., with split prefetch control circuitry for different cache levels, control circuitry at one level may signal to another level using a sideband mechanism to initiate security tag prefetches. As one specific example, a prefetcher for a lower-level cache may initiate a zombie prefetch that does not cause training of any access maps but causes a prefetcher for a last-level cache to generate one or more prefetches to the last-level cache for security tags. This may facilitate coordination among prefetch levels in embodiments that do not utilize unified prefetching.

Example Embodiments of Prefetching for Multiple Cache Levels

In some embodiments, an access-map-based prefetcher may be configured to generate prefetches for multiple cache levels. While various example embodiments discussed herein support prefetches to two different cache levels (e.g., N and N+M), it may be desirable to prefetch to additional cache levels (e.g., a cache level N+Q that is between N and N+M). Adding prefetches for additional cache levels may present challenges, e.g., in efficiently utilizing bits per access pattern symbol. For example, while the symbols of FIG. 3 may all be representable using three bits, adding a full set of similar symbols for another cache level might utilize four bits per symbol, which may be undesirable. Therefore, one or more prefetch symbols are overloaded to support states for multiple caches, in some embodiments.

FIG. 14 is a diagram illustrating example access category symbols with prefetching into three cache levels, according to some embodiments. In the illustrated example, the P symbol is overloaded to indicate states for multiple cache levels. Specifically, the P symbol indicates that a prefetch has been launched to either the level N cache or to the level N+Q cache. The new ^ symbol indicates that a prefetch is pending to the level N+Q cache, which may enable the prefetch launcher to launch a prefetch to the correct cache level. In some embodiments, a "2" symbol in a stored prefetch pattern may be used at pattern application to insert the ^ symbol in a map based on a match with the stored pattern. Adding one or more 2's to the density pattern, for example, may allow next-line prefetches into the level N+Q cache.

Note that overload of the P symbol may result in an inability to distinguish between launched prefetches to the N+Q cache and the N cache. This may in turn prevent upgrade of a prefetch from the N+Q cache to a prefetch to the N cache. This may be a satisfactory tradeoff for avoiding increasing the number of bits per symbol, however. In these embodiments, prefetches to the N+Q and N+M cache levels may share a launch queue.

Prefetching for an additional cache level may also be implemented to avoid disturbing tuned prefetch parameters or metrics for other caches, such as quality factors. For example, an initial BQF for the level N+M cache may be determined based on initial alignment of a demand (e.g., whether the next line prefetched to level N+Q would straddle a new level N+M cache line). Further, one or more quality factors may be maintained specifically for the level N+Q cache.

Overview of System with Prefetch Circuitry

Figure 15:
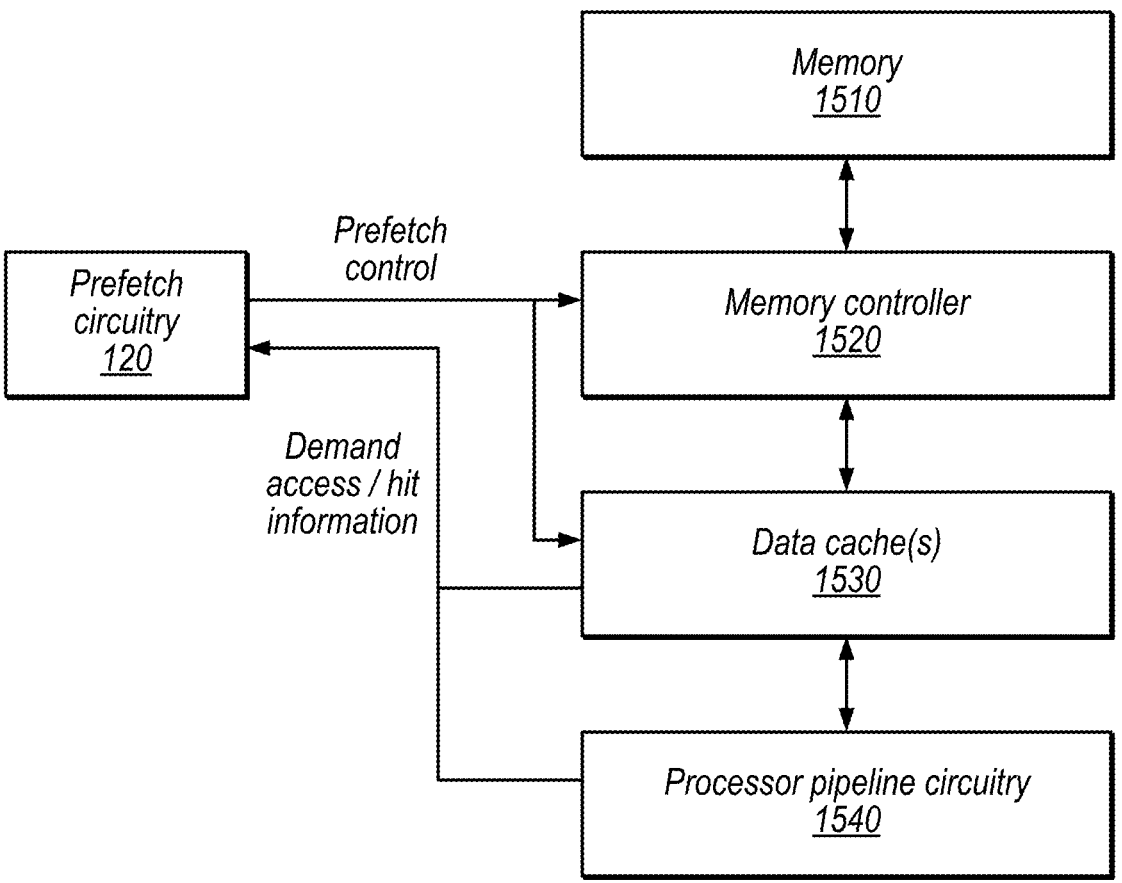
FIG. 15 is a block diagram illustrating an example system that includes prefetch circuitry, according to some embodiments.

FIG. 15 is a block diagram illustrating an example system that includes prefetch circuitry, according to some embodiments. In the illustrated example, the system includes prefetch circuitry 120, memory 1510, memory controller 1520, data cache(s) 1530, and processor pipeline circuitry 1540.

In some embodiments, all of the illustrated elements except for memory 1510 are included in a processor or processor core. In other embodiments, prefetch circuitry 120 may also perform prefetches for other circuitry, e.g., other components of a system on a chip. Memory 1510, in some embodiments, is a dynamic random-access memory (DRAM) that implements system memory (although it may in turn be backed by storage such as a hard drive and may implement paging, for example).

Memory controller 1520, in some embodiments, is configured to access memory 1510. As shown, memory controller 1520 may receive prefetched control signals from prefetch circuitry 120 to prefetch data from memory into one or more data cache(s) 1530.

Data cache(s) 1530 may include one or more cache levels (e.g., an L1 cache, an L2 cache, a last-level cache (e.g., an L3) cache, etc.). Data caches 1530 may also receive prefetch signals, e.g., to attempt to prefetch data from another cache level, although in other embodiments prefetches may be performed only from memory 1510 into a given requested cache level. Embodiment with multiple cache levels may have different characteristics at different levels, e.g., number of entries, virtually or physically tagged, cache line sizes, associativity implementations, replacement schemes, etc.

Processor pipeline circuitry 1540, in some embodiments, is configured to execute instructions (e.g., of an instruction set architecture), micro-ops, or both. Circuitry 1540 may implement various appropriate stages, such as fetch, decode, issue, ALU stages, load-store unit stages, etc. Various instructions may cause memory accesses and pipeline circuitry 1540, data cache(s) 1530, or both may provide information to prefetch circuitry 120 about demand accesses and whether they hit at one or more cache levels.

In various embodiments, disclosed techniques may improve prefetch performance for prefetch circuitry 120, reduce unused prefetches, or both, which may in turn improve cache efficiency. Improving cache efficiency may advantageously improve performance of the processor, reduce power consumption, or both.

Example Methods

FIG. 16 is a flow diagram illustrating an example method for PC-based supplemental learning for a pattern-based prefetcher, according to some embodiments. The method shown in FIG. 16 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1610, in the illustrated embodiment, a computing system (e.g., prefetch circuitry 120) stores, in a prefetch table, access map data based on address information corresponding to memory accesses, where a given access map of a plurality of stored access maps records categories of prior accesses to different offsets in a defined address region.

At 1620, in the illustrated embodiment, the computing system (e.g., prefetch circuitry 120) generates based on the access map data and stored access patterns, one or more prefetch requests to prefetch data to a cache.

At 1630, in the illustrated embodiment, the computing system (e.g., supplemental access tracking circuitry 110) stores initial access tracking information for offsets corresponding to a first access map evicted from the prefetch table. In some embodiments, this includes aligning the first access map with the offset of the initial memory access that touched the first access map. In some embodiments, the initial access tracking information includes respective counter values for different offsets in the defined address region.

At 1640, in the illustrated embodiment, the computing system (e.g., supplemental access tracking circuitry 110) stores program counter information associated with an initial memory access that touched the first access map. In some embodiments, the program counter information is a hashed program counter.

At 1650, in the illustrated embodiment, the computing system (e.g., supplemental access tracking circuitry 110) updates the access tracking information, based on one or additional access maps evicted from the prefetch table that match the stored program counter information. The update to the access tracking information may include adjusting one or more of the counter values based on the one or more additional evicted access maps.

At 1660, in the illustrated embodiment, the computing system (e.g., supplemental access tracking circuitry 110) detects a hit for the updated access tracking information based on comparison of the stored program counter information and program counter information for a subsequent memory access.

At 1670, in the illustrated embodiment, the computing system (e.g., supplemental access tracking circuitry 110)

generates, in response to the hit and based on the updated access tracking information, a starting access map for allocation in the prefetch table. In some embodiments, the starting access map is different than a default starting access map that the prefetch circuitry is configured to use if there is not a hit in the supplemental access tracking circuitry.

In some embodiments, the prefetch circuitry supports multiple different granularities corresponding to distance between offsets in a given access map and the supplemental access tracking circuitry is further stores granularity information that indicates a granularity of the first access map. The computing system may then restore the stored granularity for the starting access map. In some embodiments, in response to a threshold number of mismatches between the stored granularity information and granularities of subsequently evicted access maps, the supplemental access tracking circuitry updates the stored granularity information to match the granularity of the subsequently evicted access maps.

FIG. 17 is a flow diagram illustrating an example method for compressed storage of demoted access map data, according to some embodiments. The method shown in FIG. 17 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1710, in the illustrated embodiment, a computing system (e.g., prefetch circuitry 120) stores access map data in a prefetch table based on address information corresponding to memory accesses, where a given access map of a plurality of stored access maps records categories of prior accesses to different offsets in a defined address region.

At 1720, in the illustrated embodiment, the computing system (e.g., prefetch circuitry 120) generates, based on the access map data and stored access patterns, one or more prefetch requests to prefetch data to a cache.

At 1730, in the illustrated embodiment, the computing system (e.g., prefetch circuitry 120) determines replacement information for stored access maps.

At 1740, in the illustrated embodiment, the computing system (e.g., prefetch circuitry 120) selects a first access map for removal from the prefetch table based on the replacement information.

At 1750, in the illustrated embodiment, the computing system (e.g., compressed map storage circuitry 620) stores first data from the first access map. In this example, the first data is a proper subset of data stored in the first access map prior to the removal and at least a portion of the first data is a compressed version of data from the first access map.

In some embodiments, the first data further includes granularity information that indicates a distance between offsets for the first access map and quality factor information that indicates accuracy of prefetches that have been performed based on the first access map.

In some embodiments, prefetcher supports a first number of categories of prior accesses represented using a first number of bits (e.g., three bits) and the compressed version of the data from the first access map supports a second, smaller of categories of prior accesses represented using a second, smaller number of bits (e.g., two bits).

In some embodiments, the data from the first access map supports distinct categories for launched prefetches to a cache level and prefetches that were subsequently hit by a demand access. In some embodiments, the compressed version of the data supports a single category for launched prefetches to the cache level and prefetches that were subsequently hit by a demand access. In some embodiments, the data from the first access map supports distinct categories for pending prefetches and no access. In some embodiments, the compressed version of the data supports a single category for pending prefetches and no access (e.g., as shown in FIG. 7C).

In some embodiments, the compressed map storage circuitry is configured to determine hits and misses in its entries based on at least a portion of virtual addresses for demand accesses.

In some embodiments, compressed map storage circuitry includes three content-addressable memories. This may include a first content-addressable memory configured to determine whether there is a hit in the compressed map storage circuitry for a miss in the prefetch circuitry, a second content-addressable memory configured to invalidate an entry in the compressed map storage circuitry based on a granularity change for an overlapping access map in the prefetch circuitry, and a third content-addressable memory configured to invalidate an entry in the compressed map storage circuitry when chaining for an access map in the prefetch circuitry overwrites a portion of the access map that overlaps with the entry.

At 1760, in the illustrated embodiment, the computing system (e.g., control circuitry 610) allocates, in response to an access to a memory address that matches the stored first data in the compressed map storage, an access map in the prefetch table with promoted access map information generated based on the stored first data.

In some embodiments, the promoted access map information includes a granularity for the allocated access map based on the granularity information in the first data, starting access map categories for the allocated access map based on the compression version of the data from the first access map, and quality factor information based on quality factor information in the first data.

In some embodiments, various control circuits may provide adjustments to avoid longer map lifetimes (e.g., due to storage in compressed map circuitry 620 instead of losing map information on eviction) causing over-prefetching. For example, for an access map that meets a threshold granularity, the computing device may reduce the granularity for storage in the first data and clear the access map for storage, where the granularity indicates a distance between offsets for a given access map. The computing device may then utilize a default starting access map and the reduced granularity in conjunction with promotion to the prefetch circuitry (e.g., as shown in FIG. 8A).

As another example, the computing device may be configured not to store granularity up-switch metadata from the first access map, where the up-switch metadata is used to determine when to up-switch granularity to increase distance between offsets in a given access map.

As another example, the computing device may adjust a counter in a first direction in response to a given access map falling below a threshold position in a least-recently-used scheme, adjust the counter in an opposite direction in response to a demand access that touches the access map when the access map is not below the threshold position, and prevent up-switch of the access map above a threshold granularity between offsets in the access map based on the counter having a value past a counter threshold in the first direction (e.g., as shown in FIG. 8B).

As still another example, the computing device may allocate the access map in the prefetch circuitry with the promoted access map information, at a position in a least-recently-used value that is not a most-recently-used position.

FIG. 18 is a flow diagram illustrating an example method for adaptive adjustments of prefetch constraints, according to some embodiments. The method shown in FIG. 18 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1810, in the illustrated embodiment, a computing system (e.g., prefetch circuitry 120) stores access map data based on address information corresponding to memory accesses, where a given access map of a plurality of stored access maps records categories of prior accesses to different offsets in a defined address region.

At 1820, in the illustrated embodiment, the computing system (e.g., prefetch launch circuitry of prefetch circuitry 120) generates, based on the access map data and stored access patterns, one or more prefetch requests to prefetch data to a cache.

At 1830, in the illustrated embodiment, the computing system (e.g., adaptive control circuitry 910) determines a number of active maps in the prefetch circuitry. In some embodiments, the computing system determines whether a given map is active based on whether the map has been updated within a threshold number of updates to maps stored by the prefetch circuitry (e.g., using the circuitry of FIG. 10).

At 1840, in the illustrated embodiment, the computing system (e.g., adaptive control circuitry 910) imposes, in response to the number of active maps meeting a threshold, a first restriction on a prefetch parameter for at least a first category of access maps. In some embodiments, the first category of access maps reflect memory accesses by hardware-accelerated matrix operations. In other embodiments, the first category of access maps may be maintained for various types of acceleration or coprocessor circuitry.

In some embodiments, the control circuitry is configured to estimate, based on the number of active maps, a number of active streams in a current hardware-accelerated workload. In these embodiments, the threshold may the threshold may correspond to a large language model workload (e.g., where a number of active streams that does not meet the threshold indicates an LLM workload). In some embodiments, the computing device provides greater prefetch depth for a smaller number of streams and a greater prefetch breadth for a larger number of streams.

In some embodiments, the first restriction is a distance restriction on pre-fetch distance ahead of a most recent demand access. In some embodiments, the first restriction is a degree restriction on a number of strides ahead of a most recent demand access. In some embodiments, the first restriction is a distance restriction on pre-fetch distance ahead of a most recent demand access. Note that the computing device may reduce multiple restrictions based on meeting or not meeting the threshold (or based on different thresholds).

At 1850, in the illustrated embodiment, the computing system (e.g., adaptive control circuitry 910) reduces, in response the number of active maps in the prefetch circuitry failing to meet the threshold, the first restriction on the parameter. In some embodiments, the reduction of the first restriction removes the first restriction.

In some embodiments, the prefetch circuitry is configured to determine whether to generate a prefetch request based on comparison between a stored access pattern and an access pattern from an access map, where the comparison indicates whether the pattern matches the stored access map to within a threshold difference that allows one or more pattern categories that do not match.

In some embodiments, the threshold difference is a threshold Hamming distance. In some embodiments, the stored access pattern includes one or more wildcard categories that match any category of access in the access map. In some embodiments, the prefetch circuitry is configured to generate a prefetch request only in response to an exact match between a stored access pattern and an access map for a first set of stored access patterns and generate a prefetch request in response to matches within the threshold difference between a stored access pattern and an access map for a second set of stored access patterns. In some embodiments, the prefetch circuitry is configured not to change granularity for a given access map in response to a hit for the access map that is not an exact match with a stored access map.

FIG. 19 is a flow diagram illustrating an example method for metadata prefetching, according to some embodiments. The method shown in FIG. 19 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1910, in the illustrated example, a computing system (e.g., metadata control circuitry) stores security tag metadata for blocks of data in a memory space, where the metadata is stored at non-contiguous addresses relative to corresponding data blocks in the memory space. In some embodiments, the security tag metadata is memory tagging extension (MTE) data that includes 128 bytes of MTE tags per 4 kilobyte data block. In some embodiments, the security tag metadata for a given data block is stored at a physical address with a defined relationship to a physical address of the given data block.

At 1920, in the illustrated example, the computing system accesses and verifies the security tag metadata in conjunction with accessing a corresponding block of data.

At 1930, in the illustrated example, the computing system (e.g., prefetch circuitry 120) stores access map data based on address information corresponding to memory accesses, where a given access map of a plurality of stored access maps records categories of prior accesses to different offsets in a defined address region.

At 1940, in the illustrated example, the computing system (e.g., prefetch circuitry 120) generates, based on the access map data and stored access patterns, one or more prefetch requests to prefetch data to a cache.

At 1950, in the illustrated example, the computing system (e.g., prefetch circuitry 120) stores, for a given access map, security tag information that indicates whether security tag metadata has been prefetched for one or more data blocks represented by the given access map. In some embodiments, the system stores indications for different numbers of data blocks in the security tag information for access maps with different granularities of offsets in the corresponding defined address region.

At 1960, in the illustrated example, the computing system (e.g., control circuitry 1260) generates, in response to determining that a set of demand requests in an access map is approaching a block boundary of a first data block whose security tag metadata has not been prefetched according to the security tag information, a prefetch of security tag metadata corresponding to the first data block.

In some embodiments, the computing system generates the prefetch of the security tag metadata based on a determination that the prefetch circuitry has requested, based on the access map and a stored access pattern, one or more prefetches within the first data block. As discussed above, various logic may trigger prefetch requests based on access map parameters relating to nearness of demand accesses, pending prefetches, launched prefects, etc. (e.g., where the parameters may be defined in relation toa block boundary, in terms of distance from the boundary, whether the category of access has crossed the boundary, etc.).

In some embodiments, for one or more instruction types for which the prefetch circuitry is configured not to prefetch data, the prefetch circuitry is configured to generate access map information and initiate corresponding security tag prefetches based on the access map information. This may allow prefetching metadata even for instructions for which data is not prefetched.

In some embodiments, the system generates artificial cache criticality information for one or more prefetched cache lines with prefetched security tag metadata.

In some embodiments, prefetch circuitry requests prefetches for multiple cache levels and encodes multiple categories of accesses in an access map using the same encoding, including a prefetch launched category for a first cache level and a prefetch launched category for a second cache level (as shown in the example of FIG. 14). In some embodiments, a first cache at the first cache level shares a prefetch queue with a second cache at another cache level. In these embodiments, prefetches for the first cache level may include first number of bytes and prefetches for the second cache level may include a second, greater number of bytes. The prefetch queue may support a field that indicates a size of a given prefetch.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Example Device

Figure 20:
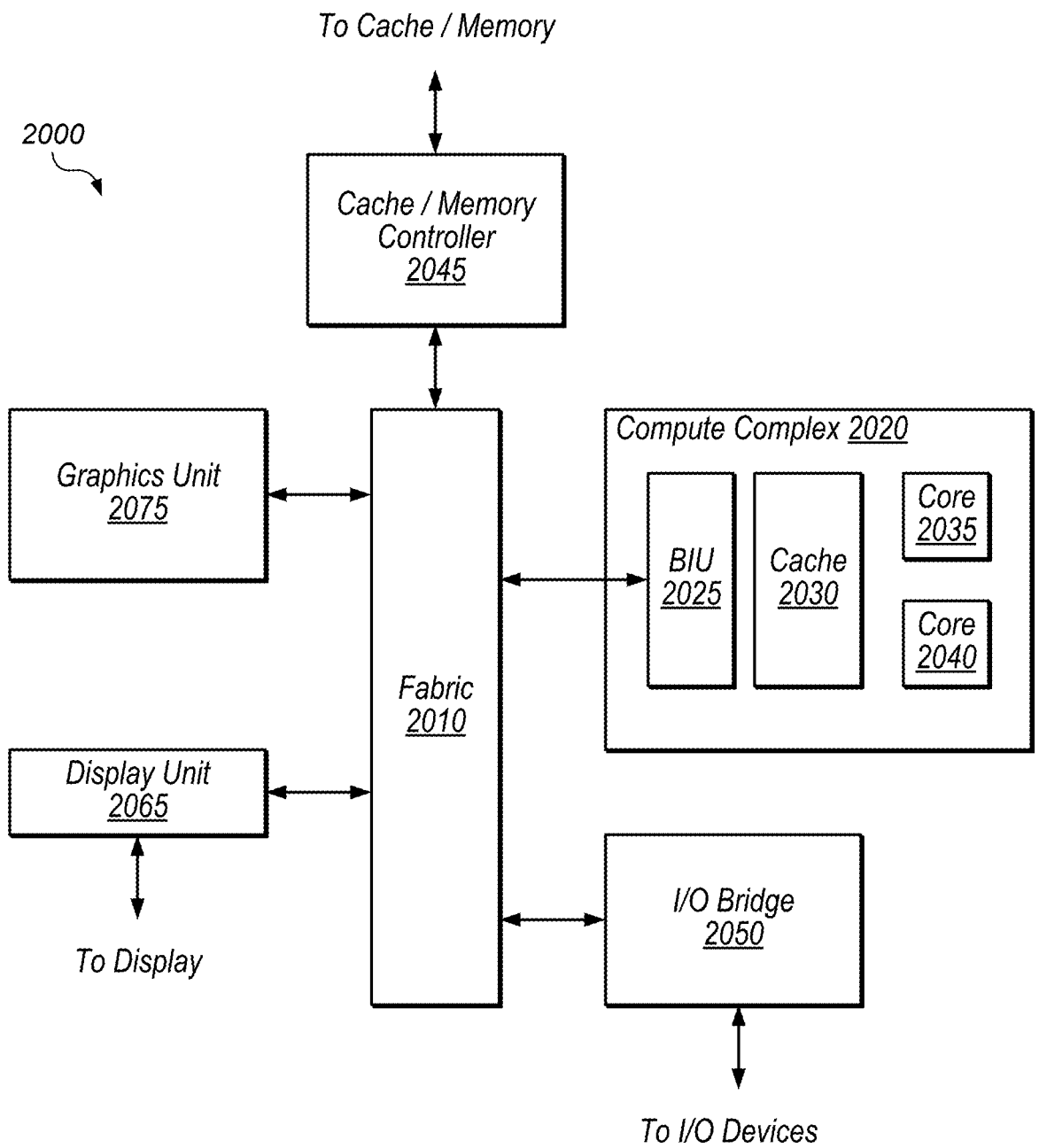
FIG. 20 is a block diagram illustrating an example computing device, according to some embodiments.

Referring now to FIG. 20, a block diagram illustrating an example embodiment of a device 2000 is shown. In some embodiments, elements of device 2000 may be included within a system on a chip. In some embodiments, device 2000 may be included in a mobile device, which may be battery-powered. Therefore, power consumption by device 2000 may be an important design consideration. In the illustrated embodiment, device 2000 includes fabric 2010, compute complex 2020 input/output (I/O) bridge 2050, cache/memory controller 2045, graphics unit 2075, and display unit 2065. In some embodiments, device 2000 may include other components (not shown) in addition to or in place of the illustrated components, such as video processor encoders and decoders, image processing or recognition elements, computer vision elements, etc.

Fabric 2010 may include various interconnects, buses, MUX's, controllers, etc., and may be configured to facilitate communication between various elements of device 2000. In some embodiments, portions of fabric 2010 may be configured to implement various different communication protocols. In other embodiments, fabric 2010 may implement a single communication protocol and elements coupled to fabric 2010 may convert from the single communication protocol to other communication protocols internally.

In the illustrated embodiment, compute complex 2020 includes bus interface unit (BIU) 2025, cache 2030, and cores 2035 and 2040. In various embodiments, compute complex 2020 may include various numbers of processors, processor cores and caches. For example, compute complex 2020 may include 1, 2, or 4 processor cores, or any other suitable number. In one embodiment, cache 2030 is a set associative L2 cache. In some embodiments, cores 2035 and 2040 may include internal instruction and data caches. In some embodiments, a coherency unit (not shown) in fabric 2010, cache 2030, or elsewhere in device 2000 may be configured to maintain coherency between various caches of device 2000. BIU 2025 may be configured to manage communication between compute complex 2020 and other elements of device 2000. Processor cores such as cores 2035 and 2040 may be configured to execute instructions of a particular instruction set architecture (ISA) which may include operating system instructions and user application instructions. These instructions may be stored in computer readable medium such as a memory coupled to memory controller 2045 discussed below.

In some embodiments, disclosed prefetch techniques may be implemented by compute complex 2020 and may advantageously improve performance, reduce power consumption, or both, relative to traditional techniques.

As used herein, the term "coupled to" may indicate one or more connections between elements, and a coupling may include intervening elements. For example, in FIG. 20, graphics unit 2075 may be described as "coupled to" a memory through fabric 2010 and cache/memory controller 2045. In contrast, in the illustrated embodiment of FIG. 20, graphics unit 2075 is "directly coupled" to fabric 2010 because there are no intervening elements.

Cache/memory controller 2045 may be configured to manage transfer of data between fabric 2010 and one or more caches and memories. For example, cache/memory controller 2045 may be coupled to an L3 cache, which may in turn be coupled to a system memory. In other embodiments, cache/memory controller 2045 may be directly coupled to a memory. In some embodiments, cache/memory controller 2045 may include one or more internal caches. Memory coupled to controller 2045 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 2045 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 2020 to cause the computing device to perform functionality described herein.

Graphics unit 2075 may include one or more processors, e.g., one or more graphics processing units (GPUs). Graphics unit 2075 may receive graphics-oriented instructions, such as OPENGL®, Metal®, or DIRECT3D® instructions, for example. Graphics unit 2075 may execute specialized GPU instructions or perform other operations based on the received graphics-oriented instructions. Graphics unit 2075 may generally be configured to process large blocks of data in parallel and may build images in a frame buffer for output to a display, which may be included in the device or may be a separate device. Graphics unit 2075 may include transform, lighting, triangle, and rendering engines in one or more graphics processing pipelines. Graphics unit 2075 may output pixel information for display images. Graphics unit 2075, in various embodiments, may include programmable shader circuitry which may include highly parallel execution cores configured to execute graphics programs, which may include pixel tasks, vertex tasks, and compute tasks (which may or may not be graphics-related).

Display unit 2065 may be configured to read data from a frame buffer and provide a stream of pixel values for display. Display unit 2065 may be configured as a display pipeline in some embodiments. Additionally, display unit 2065 may be configured to blend multiple frames to produce an output frame. Further, display unit 2065 may include one or more interfaces (e.g., MIPI® or embedded display port (eDP)) for coupling to a user display (e.g., a touchscreen or an external display).

I/O bridge 2050 may include various elements configured to implement: universal serial bus (USB) communications, security, audio, and low-power always-on functionality, for example. I/O bridge 2050 may also include interfaces such as pulse-width modulation (PWM), general-purpose input/ output (GPIO), serial peripheral interface (SPI), and inter-integrated circuit (I2C), for example. Various types of peripherals and devices may be coupled to device 2000 via I/O bridge 2050.

In some embodiments, device 2000 includes network interface circuitry (not explicitly shown), which may be connected to fabric 2010 or I/O bridge 2050. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 2000 with connectivity to various types of other devices and networks.

Example Applications

Figure 21:
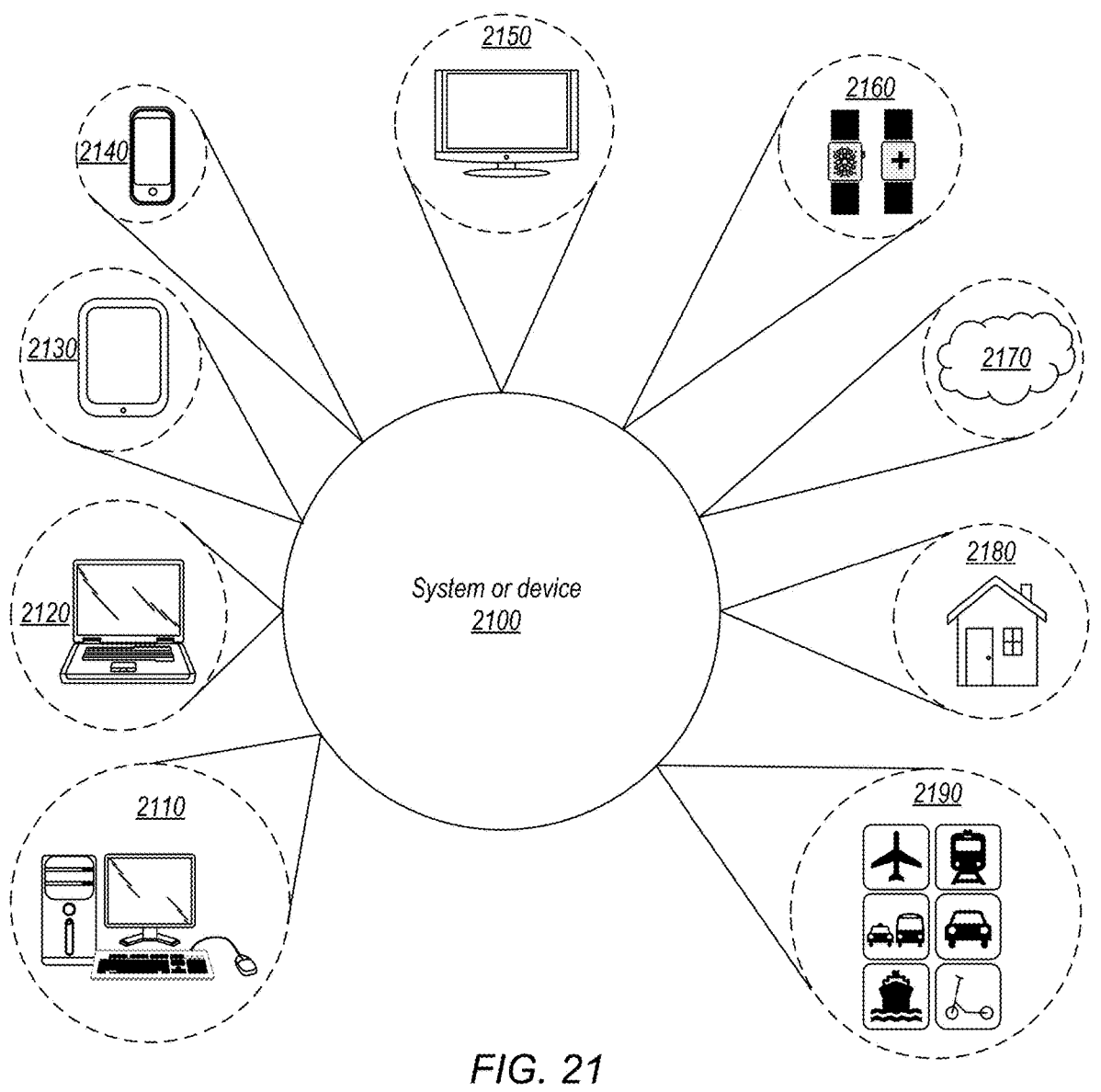
FIG. 21 is a diagram illustrating example applications of disclosed systems and devices, according to some embodiments.

Turning now to FIG. 21, various types of systems that may include any of the circuits, devices, or system discussed above. System or device 2100, which may incorporate or otherwise utilize one or more of the techniques described herein, may be utilized in a wide range of areas. For example, system or device 2100 may be utilized as part of the hardware of systems such as a desktop computer 2110, laptop computer 2120, tablet computer 2130, cellular or mobile phone 2140, or television 2150 (or set-top box coupled to a television).

Similarly, disclosed elements may be utilized in a wearable device 2160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 2100 may also be used in various other contexts. For example, system or device 2100 may be utilized in the context of a server computer system, such as a dedicated server or on shared hardware that implements a cloud-based service 2170. Still further, system or device 2100 may be implemented in a wide range of specialized everyday devices, including devices 2180 commonly found in the home such as refrigerators, thermostats, security cameras, etc. The interconnection of such devices is often referred to as the "Internet of Things" (IoT). Elements may also be implemented in various modes of transportation. For example, system or device 2100 could be employed in the control systems, guidance systems, entertainment systems, etc. of various types of vehicles 2190.

The applications illustrated in FIG. 21 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 22:
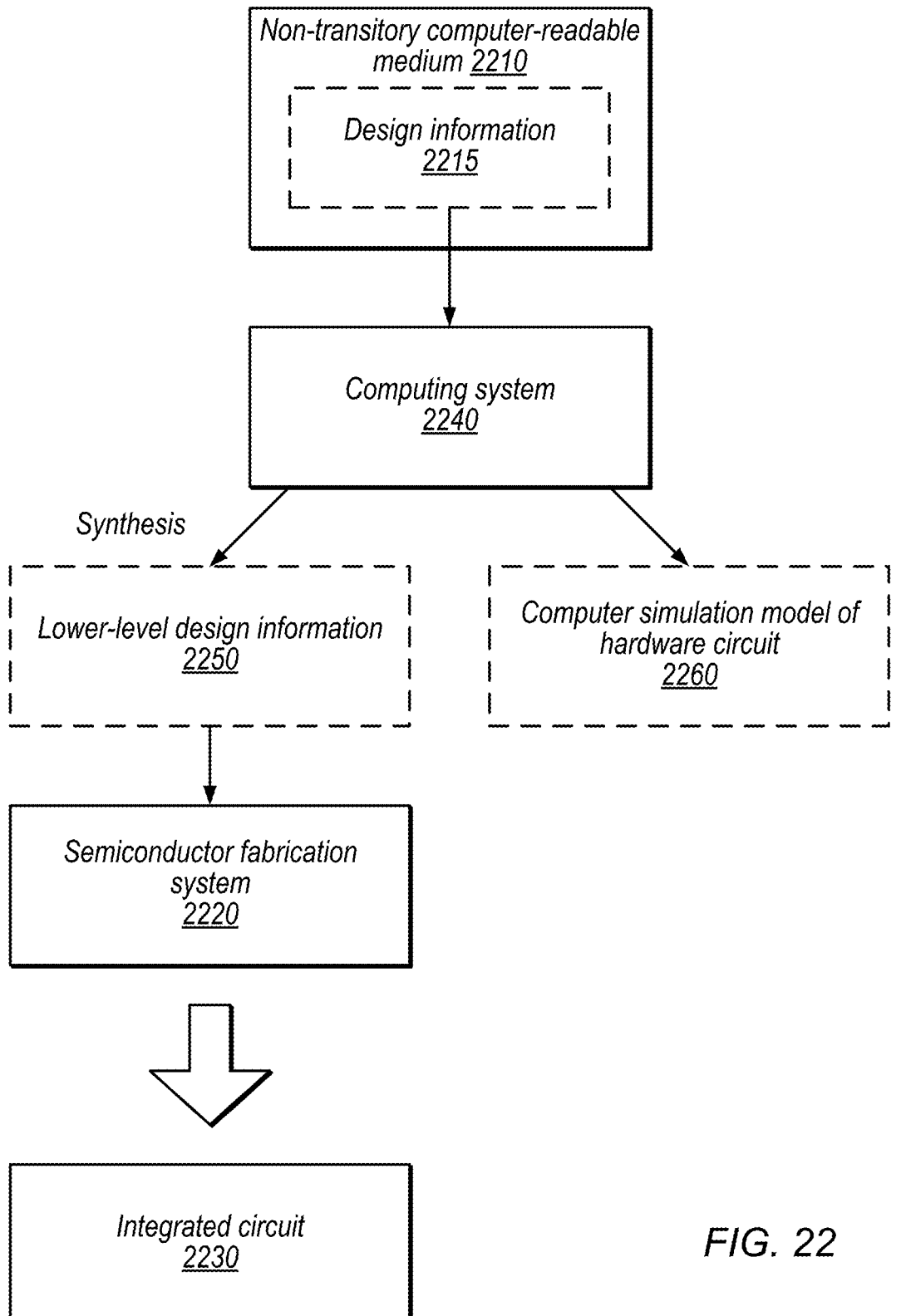
FIG. 22 is a block diagram illustrating an example computer-readable medium that stores circuit design information, according to some embodiments.

FIG. 22 is a block diagram illustrating an example non-transitory computer-readable storage medium that stores circuit design information, according to some embodiments. In the illustrated embodiment, computing system 2240 is configured to process the design information. This may include executing instructions included in the design information, interpreting instructions included in the design information, compiling, transforming, or otherwise updating the design information, etc. Therefore, the design information controls computing system 2240 (e.g., by programming computing system 2240) to perform various operations discussed below, in some embodiments.

In the illustrated example, computing system 2240 processes the design information to generate both a computer simulation model of a hardware circuit 2260 and lower-level design information 2250. In other embodiments, computing system 2240 may generate only one of these outputs, may generate other outputs based on the design information, or both. Regarding the computing simulation, computing system 2240 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 2240 also processes the design information to generate lower-level design information 2250 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 2250 (potentially among other inputs), semiconductor fabrication system 2220 is configured to fabricate an integrated circuit 2230 (which may correspond to functionality of the simulation model 2260). Note that computing system 2240 may generate different simulation models based on design information at various levels of description, including information 2250, 2215, and so on. The data representing design information 2250 and model 2260 may be stored on medium 2210 or on one or more other media.

In some embodiments, the lower-level design information 2250 controls (e.g., programs) the semiconductor fabrication system 2220 to fabricate the integrated circuit 2230. Thus, when processed by the fabrication system, the design information may program the fabrication system to fabricate a circuit that includes various circuitry disclosed herein.

Non-transitory computer-readable storage medium 2210, may comprise any of various appropriate types of memory devices or storage devices. Non-transitory computer-readable storage medium 2210 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 2210 may include other types of non-transitory memory as well or combinations thereof. Accordingly, non-transitory computer-readable storage medium 2210 may include two or more memory media; such media may reside in different locations—for example, in different computer systems that are connected over a network.

Design information 2215 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 2240, semiconductor fabrication system 2220, or both. In some embodiments, design information may also include one or more cell libraries that specify the synthesis, layout, or both of integrated circuit 2230. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 2230 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 2220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 2220 may also be configured to perform various testing of fabricated circuits for correct operation.

In various embodiments, integrated circuit 2230 and model 2260 are configured to operate according to a circuit design specified by design information 2215, which may include performing any of the functionality described herein. For example, integrated circuit 2230 may include any of various elements shown in FIGS. 1, 6, 9-11, 12D, 15, and 20. Further, integrated circuit 2230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 2220 to fabricate integrated circuit 2230.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as Cor C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]-is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. A method, comprising:

storing, by a computing system in a prefetch table, access map data based on address information corresponding to memory accesses, wherein a given access map of a plurality of stored access maps records categories of prior accesses to different offsets in a defined address region;

generating, by the computing system based on the access map data and stored access patterns, one or more prefetch requests to prefetch data to a cache;

storing, by the computing system, initial access tracking information for offsets corresponding to a first access map evicted from the prefetch table;

storing, by the computing system, program counter information associated with an initial memory access that touched the first access map;

updating, by the computing system, the access tracking information, based on one or more additional access maps evicted from the prefetch table that match the stored program counter information;

detecting, by the computing system, a hit for the updated access tracking information based on comparison of the stored program counter information and program counter information for a subsequent memory access; and generating, by the computing system in response to the hit and based on the updated access tracking information, a starting access map for allocation in the prefetch table.

2. The method of claim 1, wherein:

the initial access tracking information includes respective counter values for different offsets in the defined address region; and the updating includes adjusting one or more of the counter values based on the one or more additional evicted access maps.

3. The method of claim 2, wherein the generating includes determining starting symbols at different offsets based on corresponding counter values of the access tracking information.

4. The method of claim 1, wherein the generating includes aligning the first access map with the offset of the initial memory access that touched the first access map.

5. The method of claim 1, wherein:

the prefetch table supports multiple different granularities corresponding to distance between offsets in a given access map; and the method further comprises storing granularity information that indicates a granularity of the first access map.

6. The method of claim 5, further comprising:

in response to a threshold number of mismatches between the stored granularity information and granularities of subsequently evicted access maps, updating the stored granularity information to match the granularity of the subsequently evicted access maps.

7. The method of claim 5, further comprising:

restoring the stored granularity for the starting access map.

8. The method of claim 1, wherein the program counter information is a hashed program counter.

9. The method of claim 1, wherein the starting access map is different than a default starting access map that is a bi-directional density pattern.

10. An apparatus, comprising:

memory circuitry; and a processor configured to execute program instructions that access data in the memory circuitry, wherein the processor includes:

data cache circuitry configured to cache data from the memory circuitry;

prefetch circuitry configured to:

store access map data based on address information corresponding to memory accesses, wherein a given access map of a plurality of stored access maps records categories of prior accesses to different offsets in a defined address region; and generate, based on the access map data and stored access patterns, one or more prefetch requests to prefetch data from the memory circuitry to the data cache circuitry; and supplemental access tracking circuitry configured to:

store initial access tracking information for offsets corresponding to a first access map evicted from the prefetch circuitry;

store program counter information associated with an initial memory access that touched the first access map;

update the access tracking information, based on one or more additional access maps evicted from the prefetch circuitry that match the stored program counter information;

detect a hit for the updated access tracking information based on comparison of the stored program counter information and program counter information for a subsequent memory access; and generate, in response to the hit and based on the updated access tracking information, a starting access map for allocation in the prefetch circuitry.

11. An apparatus, comprising:

prefetch circuitry configured to:

store access map data based on address information corresponding to memory accesses, wherein a given access map of a plurality of stored access maps records categories of prior accesses to different offsets in a defined address region; and generate, based on the access map data and stored access patterns, one or more prefetch requests to prefetch data to a cache; and supplemental access tracking circuitry configured to:

store initial access tracking information for offsets corresponding to a first access map evicted from the prefetch circuitry;

store program counter information associated with an initial memory access that touched the first access map;

update the access tracking information, based on one or more additional access maps evicted from the prefetch circuitry that match the stored program counter information;

detect a hit for the updated access tracking information based on comparison of the stored program counter information and program counter information for a subsequent memory access; and generate, in response to the hit and based on the updated access tracking information, a starting access map for allocation in the prefetch circuitry.

12. The apparatus of claim 11, wherein:

the initial access tracking information includes respective counter values for different offsets in the defined address region; and the update to the access tracking information includes adjusting one or more of the counter values based on the one or more additional evicted access maps.

13. The apparatus of claim 12, wherein, to generate the starting access map, the supplemental access tracking circuitry is configured to determine starting symbols at different offsets based on corresponding counter values of the access tracking information.

14. The apparatus of claim 11, wherein, to generate the initial access tracking information, the supplemental access tracking circuitry is further configured to align the first access map with the offset of the initial memory access that touched the first access map.

15. The apparatus of claim 11, wherein:

the prefetch circuitry supports multiple different granularities corresponding to distance between offsets in a given access map; and the supplemental access tracking circuitry is further configured to store granularity information that indicates a granularity of the first access map.

16. The apparatus of claim 15, wherein:

in response to a threshold number of mismatches between the stored granularity information and granularities of subsequently evicted access maps, the supplemental access tracking circuitry is configured to update the stored granularity information to match the granularity of the subsequently evicted access maps.

17. The apparatus of claim 15, wherein the supplemental access tracking circuitry is configured to restore the stored granularity for the starting access map.

18. The apparatus of claim 11, wherein the program counter information is a hashed program counter.

19. The apparatus of claim 11, wherein the starting access map is different than a default starting access map that the prefetch circuitry is configured to use if there is not a hit in the supplemental access tracking circuitry.

20. The apparatus of claim 11, wherein the apparatus is a computing device that further includes:

a processor that includes the prefetch circuitry and the supplemental access tracking circuitry;

a display; and network interface circuitry.

* * * * *